United States Patent
Agalgaonkar et al.

(10) Patent No.: US 12,078,286 B1
(45) Date of Patent: Sep. 3, 2024

(54) STAND FOR PORTABLE ELECTRONIC DEVICE

(71) Applicant: Pioneer Square Brands, Inc., High Point, NC (US)

(72) Inventors: Sudeep Balkrishna Agalgaonkar, Jamestown, NC (US); Vrushank Deepak Balutkar, Jamestown, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/418,271

(22) Filed: Jan. 21, 2024

(51) Int. Cl.
| | | |
|---|---|---|
| *F16M 11/10* | (2006.01) | |
| *F16M 11/04* | (2006.01) | |
| *G06F 1/16* | (2006.01) | |

(52) U.S. Cl.
CPC .......... *F16M 11/10* (2013.01); *F16M 11/041* (2013.01); *G06F 1/1607* (2013.01)

(58) Field of Classification Search
CPC ...... F16M 11/10; F16M 11/041; G06F 1/1607
USPC ................................................ 248/919–923
See application file for complete search history.

(56) References Cited

U.S. PATENT DOCUMENTS

| | | | | |
|---|---|---|---|---|
| 6,601,811 B1 * | 8/2003 | Van Lieshout | ........ | F16M 11/08 248/289.11 |
| 7,338,019 B2 * | 3/2008 | Liu | ........................ | F16M 11/24 248/921 |
| 7,474,522 B2 * | 1/2009 | Bliven | ............... | F16M 11/2021 248/176.1 |
| 7,578,490 B2 * | 8/2009 | Kim | ...................... | F16M 11/105 248/278.1 |
| 7,636,133 B1 * | 12/2009 | Hsu | ........................ | F16M 13/00 348/794 |
| 7,652,873 B2 * | 1/2010 | Lee | ...................... | G06F 1/1681 248/920 |
| 8,047,488 B2 * | 11/2011 | Wang | ..................... | F16M 11/10 248/176.1 |
| 8,837,130 B2 * | 9/2014 | Hyun | ..................... | F16M 13/00 361/679.05 |
| 8,917,500 B2 * | 12/2014 | Lee | ........................ | G06F 1/1681 248/176.1 |
| 2006/0049327 A1 * | 3/2006 | Chen | ................... | F16M 11/105 248/371 |
| 2009/0072112 A1 * | 3/2009 | Lee | ........................ | F16M 11/10 248/371 |
| 2009/0134286 A1 * | 5/2009 | Lee | ................... | F16M 11/2021 16/277 |
| 2009/0166500 A1 * | 7/2009 | Hsu | ........................ | F16M 11/10 248/371 |

(Continued)

FOREIGN PATENT DOCUMENTS

| | | | | |
|---|---|---|---|---|
| CN | 202995550 U | * | 6/2013 | |
| DE | 112011105563 T5 | * | 5/2014 | ............. F16H 21/44 |
| WO | WO-2011126191 A1 | * | 10/2011 | ............. F16M 11/04 |

*Primary Examiner* — Kimberly T Wood
(74) *Attorney, Agent, or Firm* — Grandview Law

(57) ABSTRACT

A device stand system for a portable electronic device includes a device holder assembly couplable with the portable electronic tablet device, a stand assembly, and a hinge assembly having an angular pivot range. The hinge assembly is coupled with and located between the device holder assembly and the stand assembly. The device holder assembly is pivotable through the angular pivot range of the hinge assembly relative to the stand assembly. Other aspects are described in the claims, drawings, and text forming a part of the present disclosure.

10 Claims, 33 Drawing Sheets

(56) References Cited

U.S. PATENT DOCUMENTS

| | | | |
|---|---|---|---|
| 2010/0171011 A1* | 7/2010 | Wang | F16M 11/10 |
| | | | 248/188.8 |
| 2014/0128132 A1* | 5/2014 | Cox, III | H04B 1/3888 |
| | | | 455/575.8 |
| 2014/0262847 A1* | 9/2014 | Yang | F16M 13/022 |
| | | | 206/37 |
| 2019/0187754 A1* | 6/2019 | Janzen | A47F 10/02 |

\* cited by examiner

STAND FOR PORTABLE ELECTRONIC DEVICE

SUMMARY

In one or more aspects a device stand system for a portable electronic tablet device includes (I) a device holder assembly couplable with the portable electronic tablet device; (II) a stand assembly; and (III) a hinge assembly having an angular pivot range, the hinge assembly being coupled with and located between the device holder assembly and the stand assembly, wherein the device holder assembly is pivotable through the angular pivot range of the hinge assembly relative to the stand assembly. Wherein the device holder assembly includes a device holder front member couplable to the portable electronic tablet device, the device holder front member including: a base, a first side wall extending perpendicularly from the base, a second side wall extending perpendicularly from the base, a third side wall extending perpendicularly from the base, and a fourth side wall extending perpendicularly from the base, wherein the second side wall perpendicularly extends with respect to the first side wall, wherein the third side wall parallelly extends with respect to the first side wall, and wherein the fourth side wall parallelly extends with respect to the second side wall. Wherein the device holder assembly includes a frame member removably coupled to the device holder front member, and wherein the frame member is removably coupled to the first side wall, the second side wall, the third side wall, and the fourth side wall of the device holder front member. Wherein the device holder assembly includes a device holder back member, wherein the device holder back member coupled to the device holder front member, and wherein the device holder front member is positioned between the frame member and the device holder back member. Wherein the device holder assembly includes a plate member coupled to the device holder back member, and wherein the plate member is positioned between the device holder back member and the device holder front member. Wherein the device holder assembly includes a device holder back member, wherein the device holder back member coupled to the device holder front member, and wherein the device holder front member is positioned between the frame member and the device holder back member. Wherein the device holder assembly includes a plate member coupled to the device holder back member, and wherein the plate member is positioned between the device holder back member and the device holder front member. Wherein the hinge assembly is coupled to the plate member. Wherein the device holder back member includes an elongated aperture and wherein the hinge assembly is coupled to the plate member through the elongated aperture of the device holder back member, and wherein the plate member is positioned between the hinge member and the device holder front member. Wherein the plate member includes at least one protruded surface portion, and wherein the hinge assembly is coupled to the at least one protruded surface portion of the plate member. Wherein the hinge assembly includes at least one peg member, wherein the plate member includes at least one non-threaded aperture, and wherein the at least one peg member of the hinge assembly is coupled with the at least one non-threaded aperture of the plate member. Wherein the stand assembly includes a stand lower member having a lower portion and an upper portion extending from the lower portion at a first angle, wherein the stand assembly includes a includes a stand upper front member coupled with the upper portion of the stand lower member and extending from the upper portion of the stand lower member at a second angle, and wherein the sum of the first angle and the second angle is greater than ninety degrees. Wherein the first angle and the second angle of the stand assembly are oblique angles. Wherein the stand upper front member includes a first side coupled with the hinge assembly, wherein the hinge assembly includes at least one axis of rotation extending parallel with the first side, wherein the stand upper front member includes a second side extending parallel with the first side, wherein the second side of the stand upper front member is coupled with the stand lower member. Wherein the hinge assembly includes at least one rotatable assembly, wherein the at least one rotatable assembly includes a first coupling member and a second coupling member, wherein the first coupling member and the second coupling member are pivotally coupled together, wherein the first coupling member is coupled with the device holder assembly and the second coupling member is coupled with the stand assembly. Wherein the hinge assembly includes a cylindrical member having a first aperture coupled with the first coupling member of the hinge assembly, and wherein the hinge assembly includes the cylindrical member has a second aperture coupled with the second coupling member of the hinge assembly.

In one or more aspects device stand system for a portable electronic tablet device includes (I) a device holder assembly couplable with the portable electronic tablet device; and (II) a hinge assembly having an angular pivot range, the hinge assembly being coupled with the device holder assembly, wherein the device holder assembly is pivotable through the angular pivot range of the hinge assembly. Wherein the device holder assembly includes a device holder back member, wherein the device holder assembly includes a plate member coupled to the device holder back member, and wherein the hinge assembly is coupled to the plate member. Wherein the device holder back member includes an elongated aperture, wherein the hinge assembly is coupled to the plate member through the elongated aperture of the device holder back member, wherein the plate member includes at least one protruded surface portion, and wherein the hinge assembly is coupled to the at least one protruded surface portion of the plate member.

In one or more aspects a device stand system for a portable electronic tablet device, the device stand system includes (I) a stand assembly; and (II) a hinge assembly having an angular pivot range, the hinge assembly being coupled with the stand assembly, wherein the stand assembly is pivotable through the angular pivot range of the hinge assembly. Wherein the stand assembly includes a stand lower member having a lower portion and an upper portion extending from the lower portion at a first angle, wherein the stand assembly includes a includes a stand upper front member coupled with the upper portion of the stand lower member and extending from the upper portion of the stand lower member at a second angle, wherein the sum of the first angle and the second angle is greater than ninety degrees, wherein the stand upper front member includes a first side coupled with the hinge assembly, wherein the hinge assembly includes at least one axis of rotation extending parallel with the first side, wherein the stand upper front member includes a second side extending parallel with the first side, and wherein the second side of the stand upper front member is coupled with the stand lower member. Wherein the hinge assembly includes at least one rotatable assembly, wherein the at least one rotatable assembly includes a first coupling member and a second coupling member, wherein the first coupling member and the second coupling member are pivotally coupled together, wherein the first coupling member is coupled with the device holder assembly and the second coupling member is coupled with the stand assembly, wherein the hinge assembly includes a cylindrical member having a first aperture coupled with the first coupling member of the hinge assembly, and wherein the hinge assembly includes the cylindrical member has a second aperture coupled with the second coupling member of the hinge assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Stand System for Portable Electronic Device, articles of manufacture, compositions of matter for same that may provide context, for instance, in introducing one or more processes and/or devices described herein.

DETAILED DESCRIPTION

Figure 1:
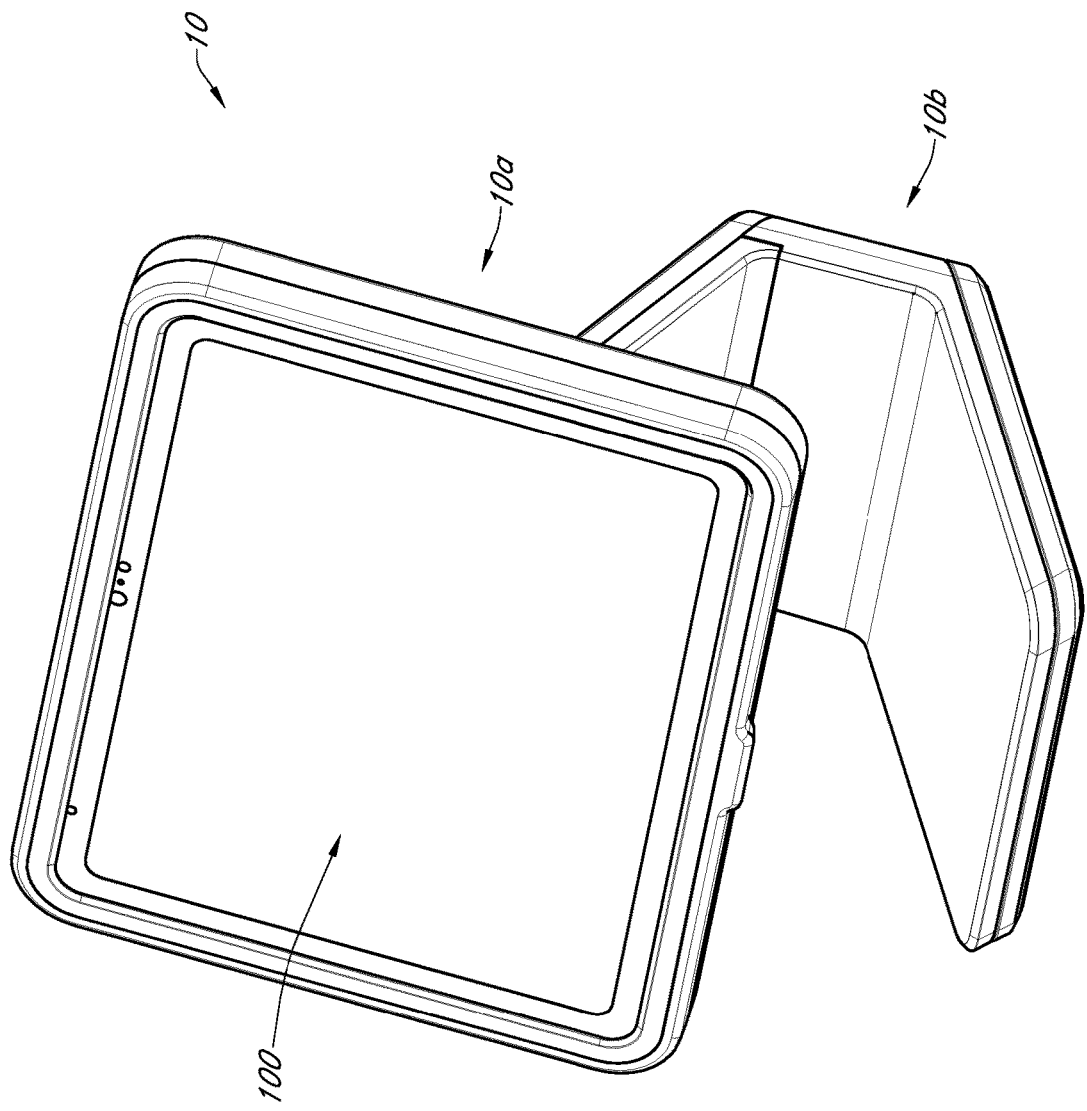
FIG. 1 is a front perspective view of device stand assembly.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a front perspective view of device stand assembly 10 with portable device 100. Depicted implementation of device stand assembly 10 is shown to include device holder assembly 10a and stand assembly 10b.

Figure 2:
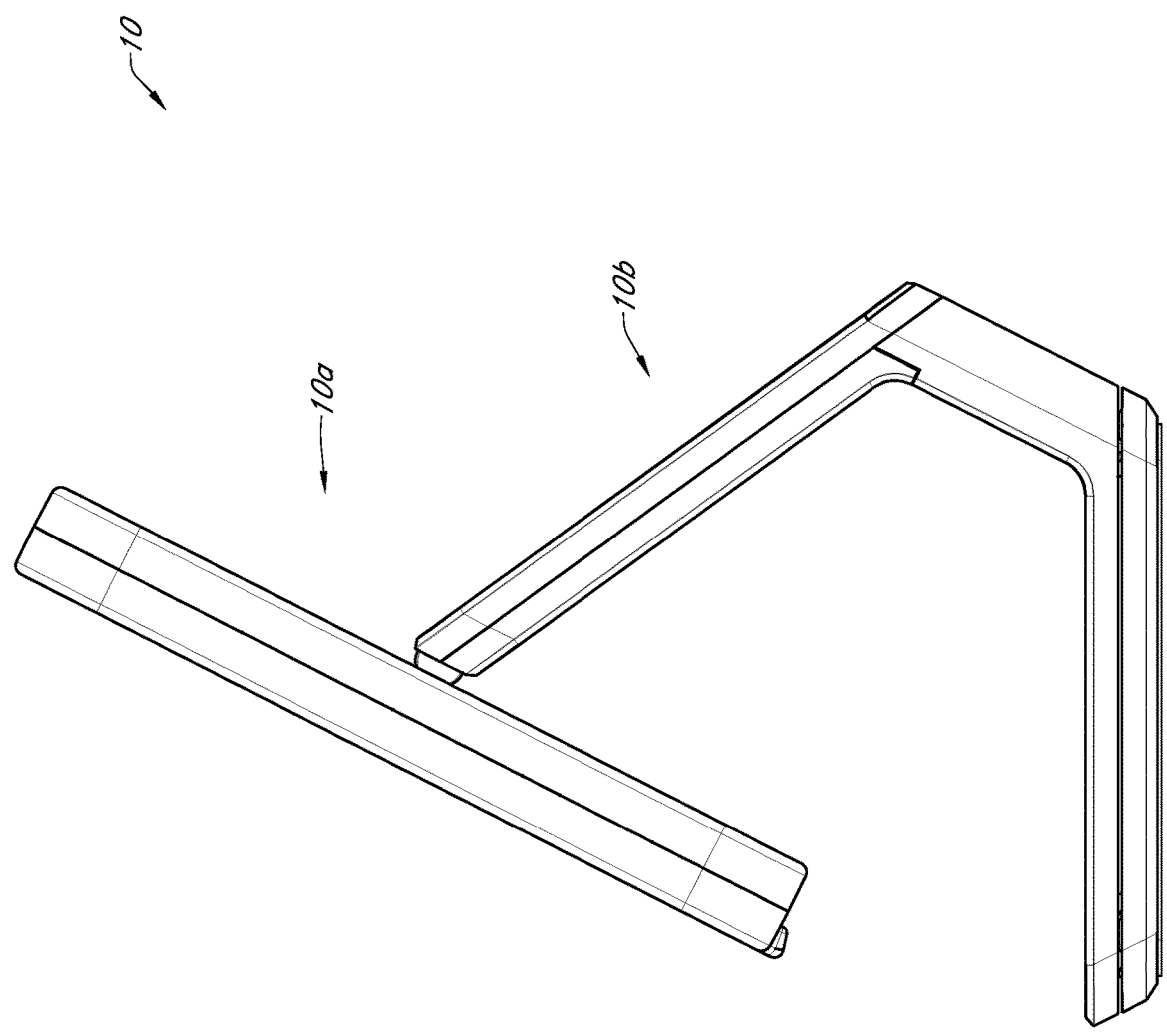
FIG. 2 is a side elevational view of device stand assembly of FIG. 1.

Turning to FIG. 2, depicted therein is a side elevational view of device stand assembly 10.

Figure 3:
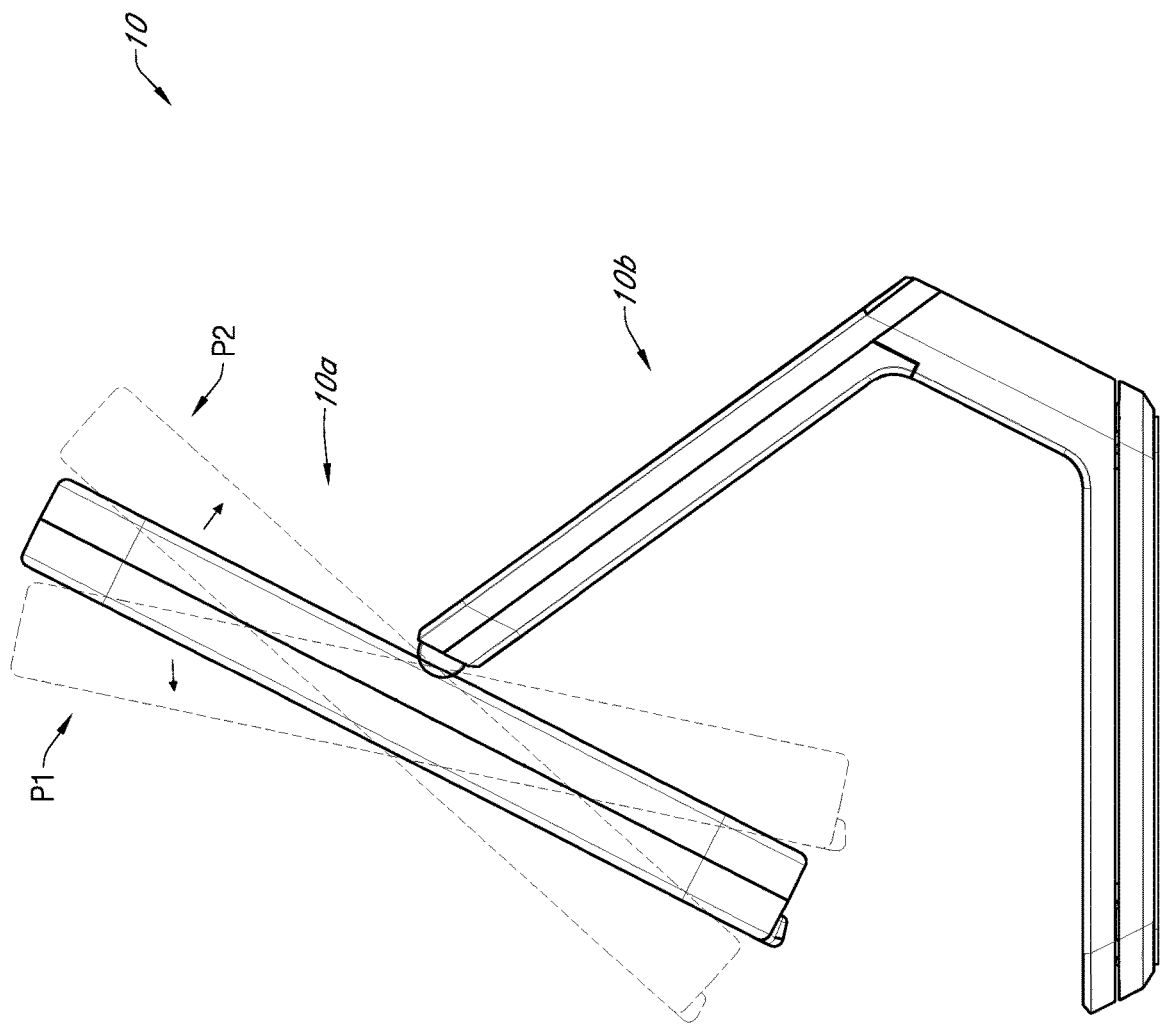
FIG. 3 is a side elevational view of device stand assembly of FIG. 1.

Turning to FIG. 3, depicted therein is a side elevational view of device stand assembly 10 showing device holder assembly 10a being tilted between position P1 and position P2.

Figure 4:
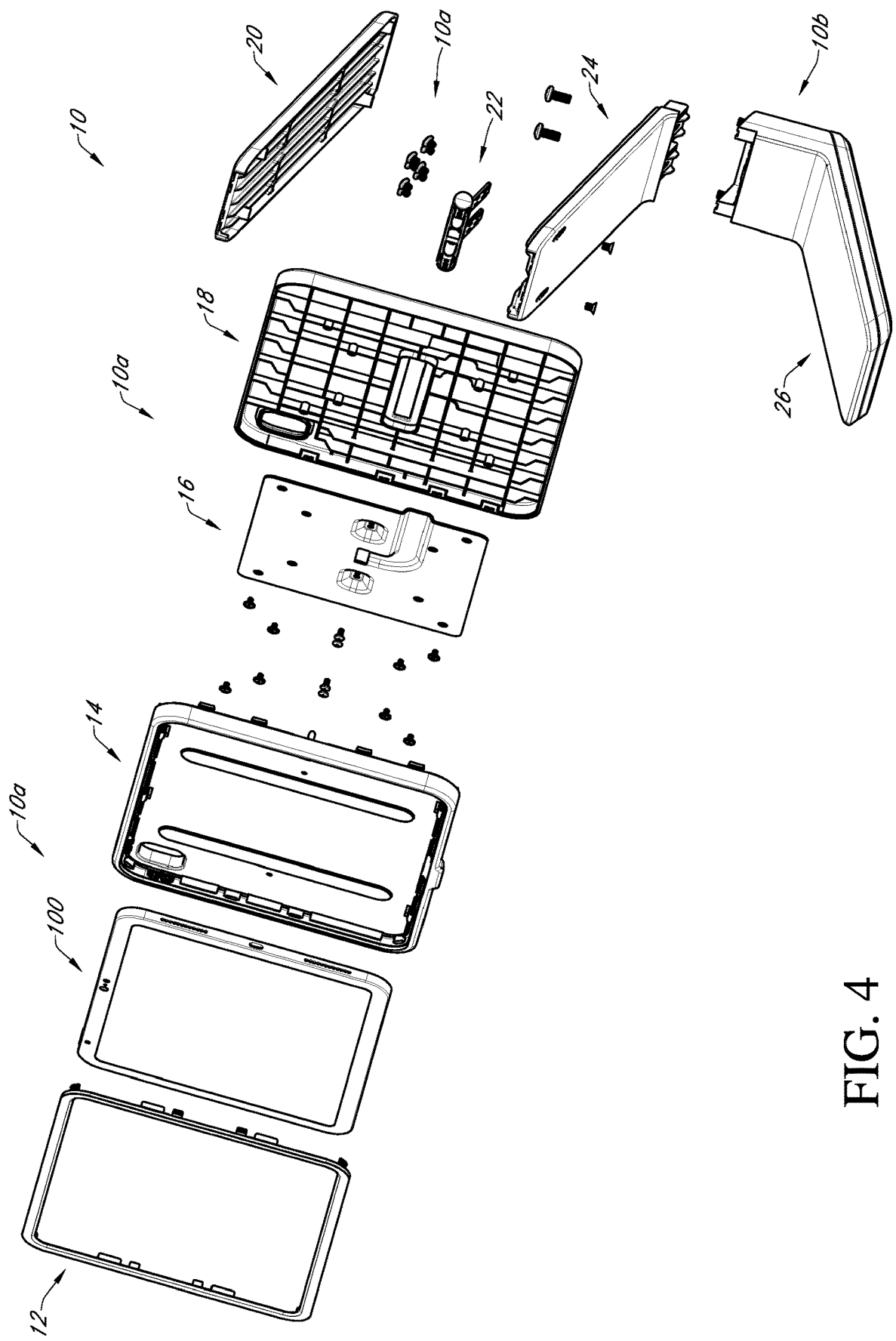
FIG. 4 is an exploded front perspective view of device stand assembly of FIG. 1.

Turning to FIG. 4, depicted therein is an exploded front perspective view of device stand assembly 10. Depicted implementation of device stand assembly 10 is shown with device holder assembly 10a to include frame 12, device holder front 14, plate member 16, and device holder back 18. Furthermore, depicted implementation of device stand assembly 10 is shown with stand assembly 10*b* to include stand upper back 20, stand upper front 24, and stand lower 26. Furthermore, depicted implementation of device stand assembly 10 is shown to include hinge assembly 22.

Figure 5:
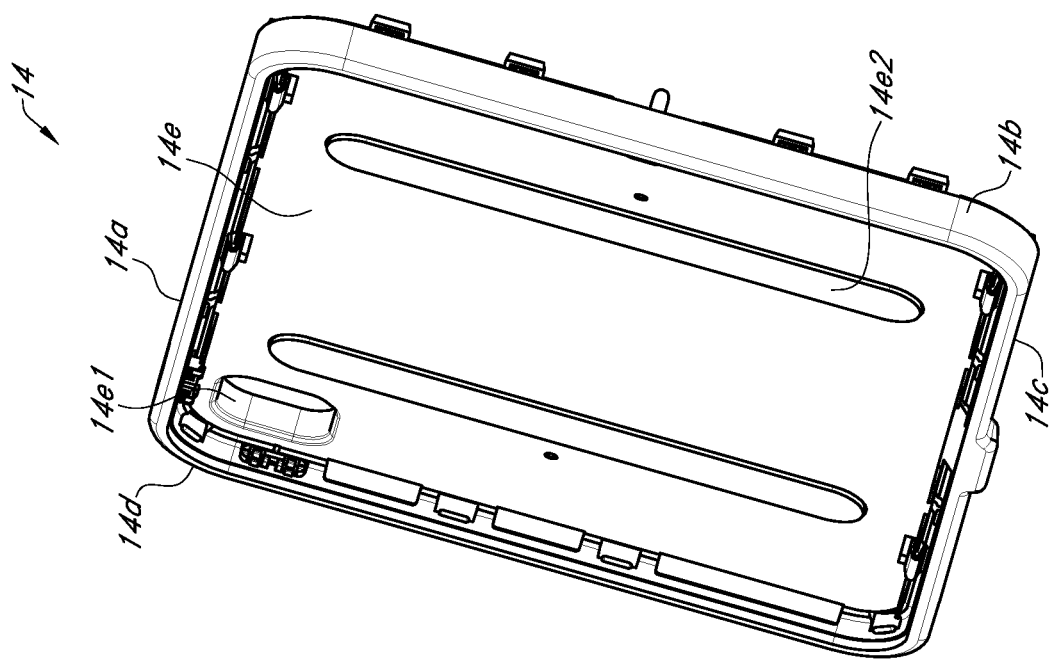
FIG. 5 is a front perspective view of device holder front of device stand assembly of FIG. 1.

Turning to FIG. 5, depicted therein is a front perspective view of device holder front 14 of device stand assembly 10. Depicted implementation of device holder front 14 is shown to include side wall 14*a*, side wall 14*b*, side wall 14*c*, side wall 14*d*, and base 14*e* with camera aperture 14*e*1 and groove 14*e*2.

Figure 6:
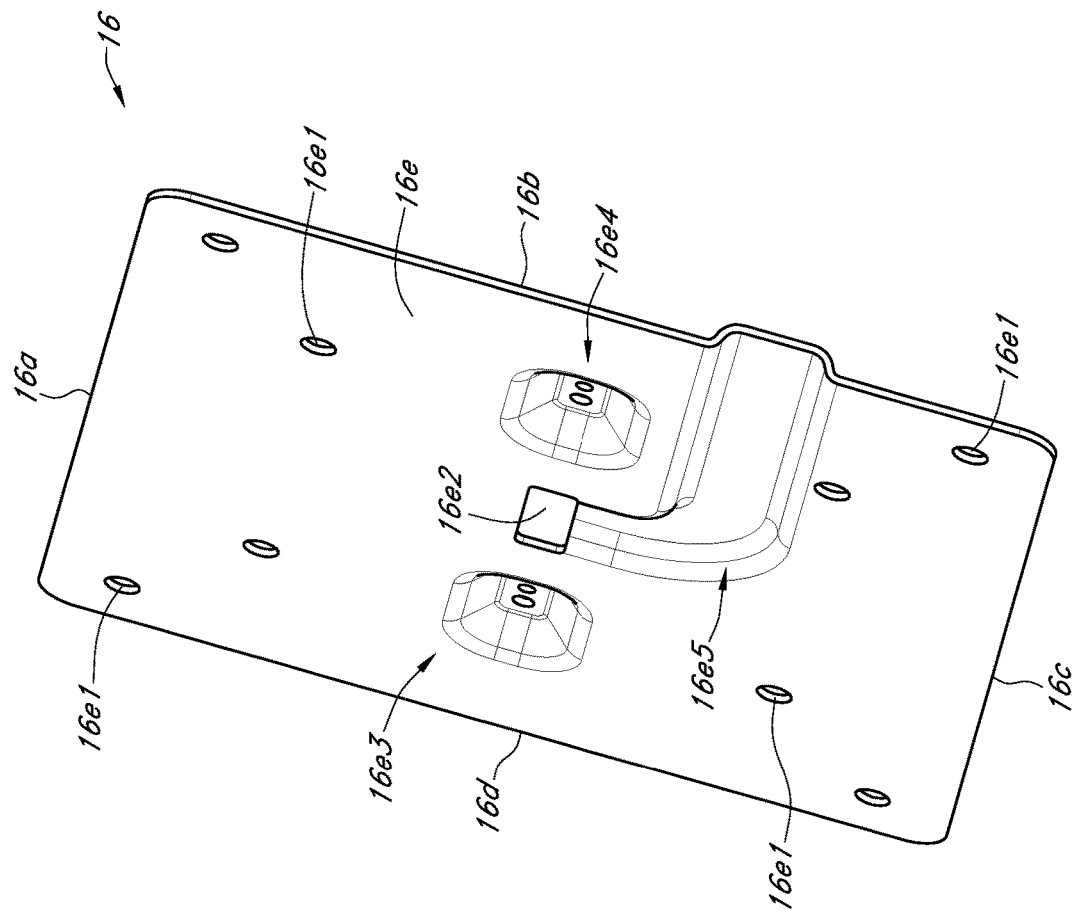
FIG. 6 is a front perspective view of plate member of device stand assembly of FIG. 1.

Turning to FIG. 6, depicted therein is a front perspective view of plate member 16 of device stand assembly 10. Depicted implementation of plate member 16 is shown to include side 16*a*, side 16*b*, side 16*c*, side 16*d*, base 16*e* with aperture 16*e*1, aperture 16*e*2, protruded surface portion 16*e*3, protruded surface portion 16*e*4, and channel 16*e*5.

Figure 7:
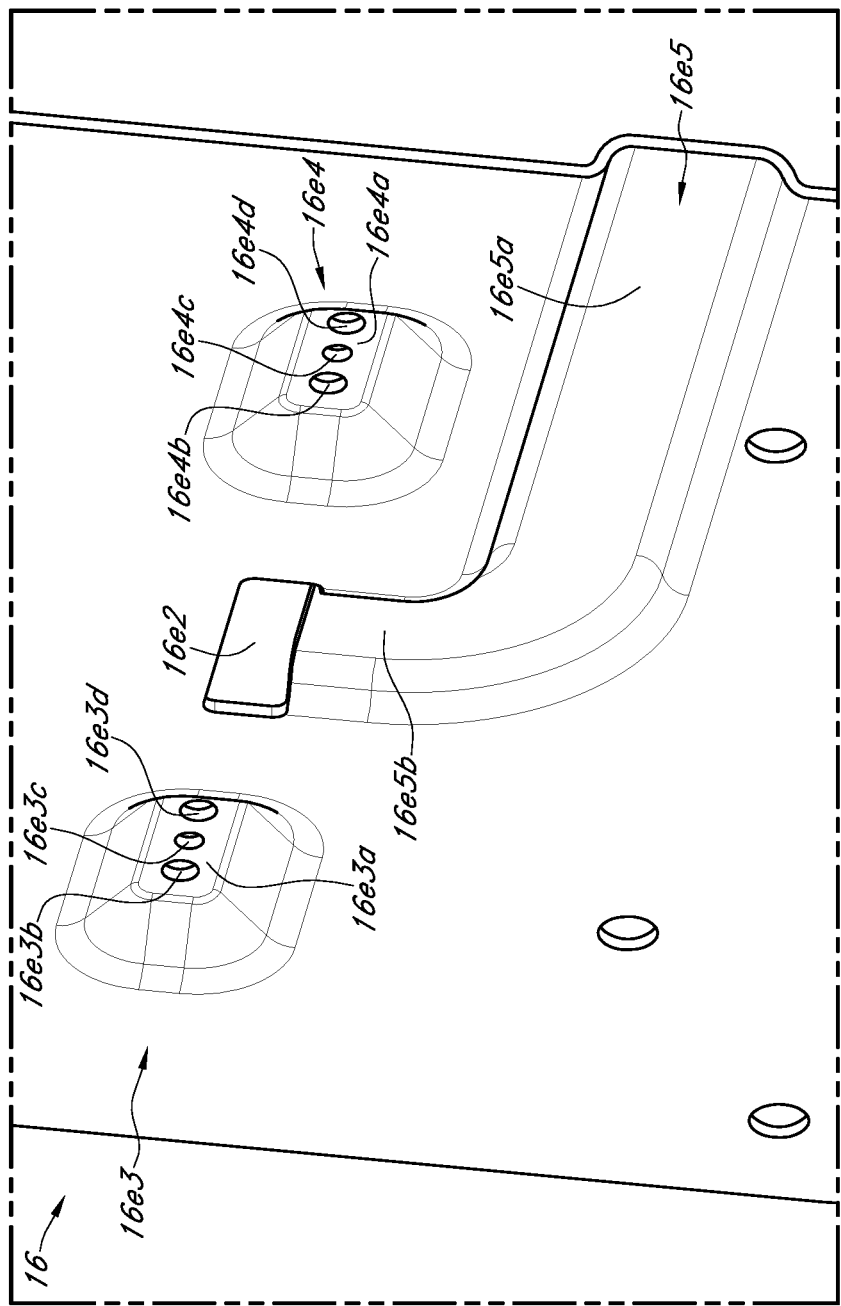
FIG. 7 is an enlarged front perspective view of a portion of plate member of device stand assembly of FIG. 1.

Turning to FIG. 7, depicted therein is an enlarged front perspective view of a portion of plate member 16 with protruded surface portion 16*e*3, protruded surface portion 16*e*4, and channel 16*e*5 of device stand assembly 10. Depicted implementation of protruded surface portion 16*e*3 is shown to include base 16*e*3*a*, threaded aperture 16*e*3*b*, aperture 16*e*3*c*, and threaded aperture 16*e*3*d*. Depicted implementation of protruded surface portion 16*e*4 is shown to include base 16*e*4*a*, threaded aperture 16*e*4*b*, aperture 16*e*4*c*, and threaded aperture 16*e*4*d*. Depicted implementation of channel 16*e*5 is shown to include channel portion 16*e*5*a* and channel portion 16*e*5*b*.

Figure 8:
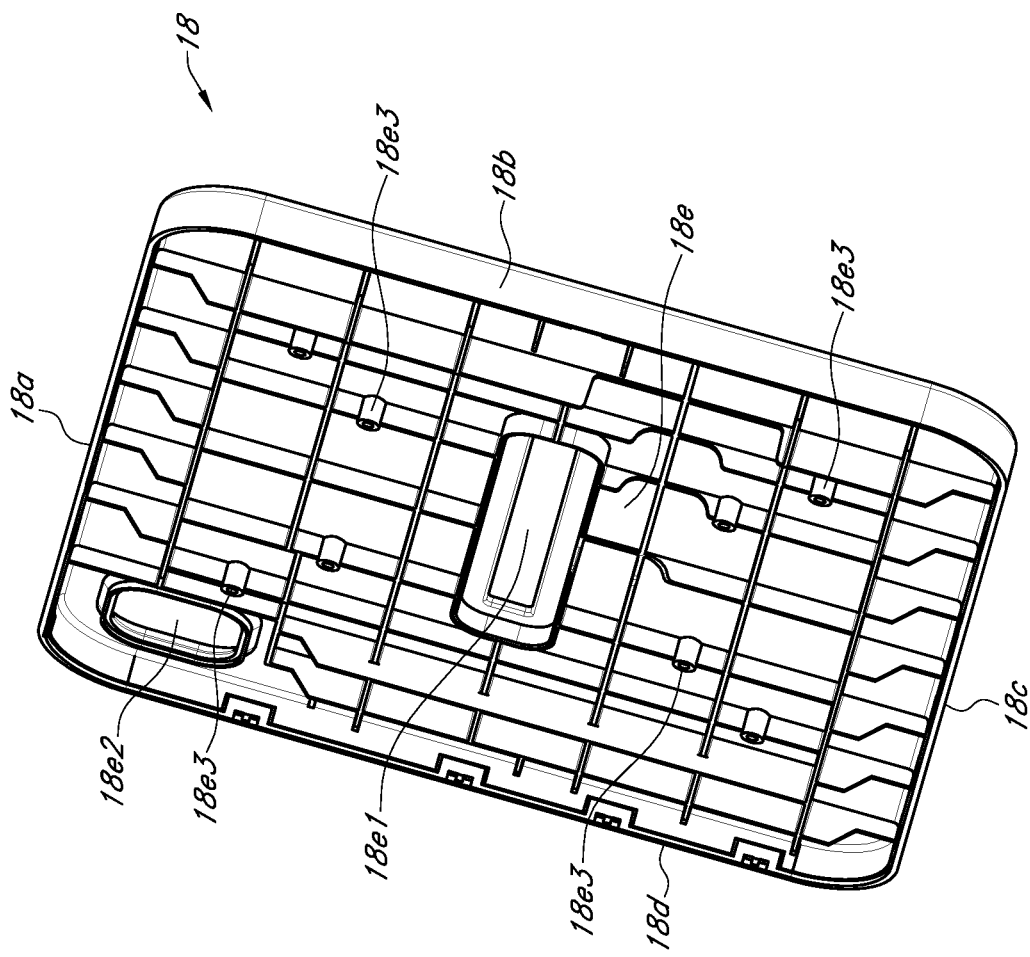
FIG. 8 is a front perspective view of device holder back of device stand assembly of FIG. 1.

Turning to FIG. 8, depicted therein is a front perspective view of device holder back 18 of device stand assembly 10. Depicted implementation of device holder back 18 is shown to include side 18*a*, side 18*b*, side 18*c*, side 18*d*, base 18*e* with rectangular aperture 18*e*1, camera aperture 18*e*2, and threaded aperture 18*e*3.

Figure 9:
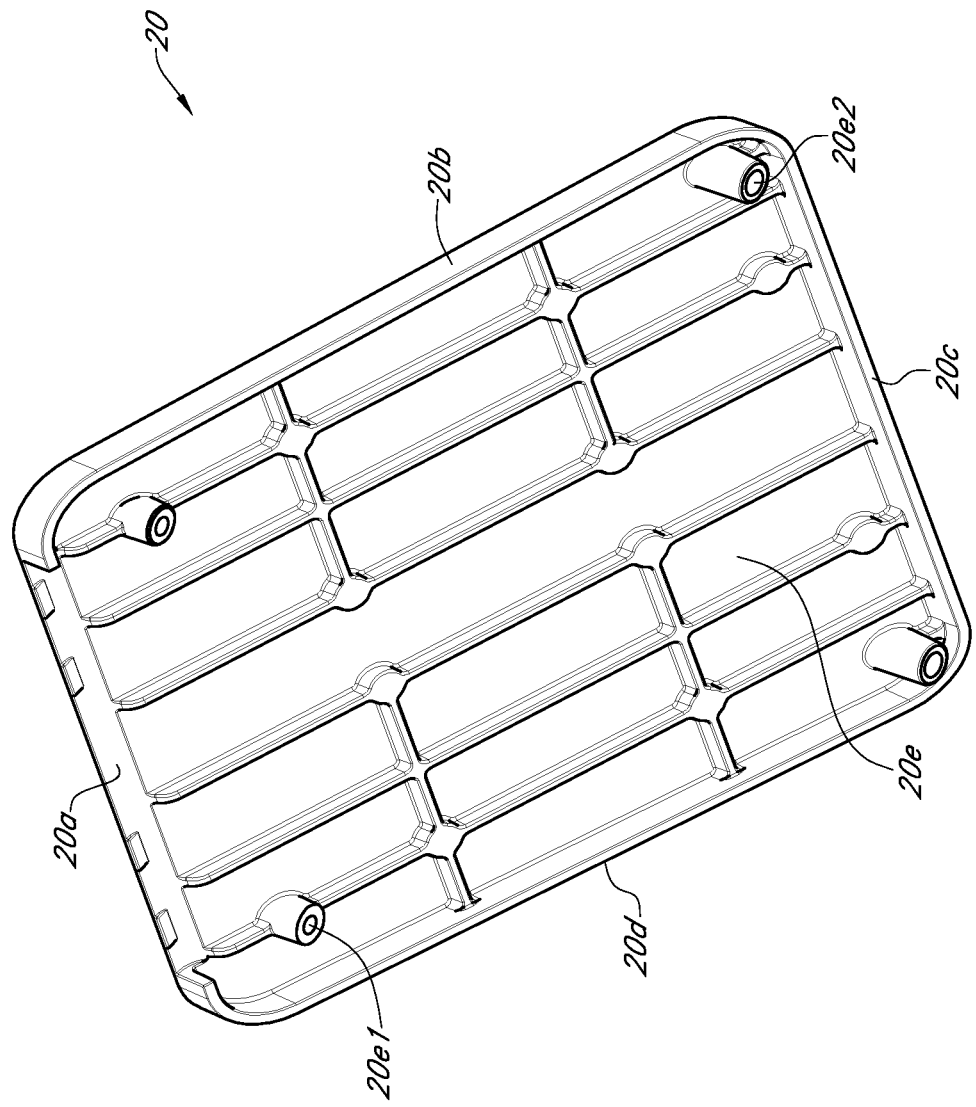
FIG. 9 is a front perspective view of stand upper back of device stand assembly of FIG. 1.

Turning to FIG. 9, depicted therein is a front perspective view of stand upper back 20 of device stand assembly 10. Depicted implementation of stand upper back 20 is shown to include side 20*a*, side 20*b*, side 20*c*, side 20*d* with base 20*e* with threaded aperture 20*e*1, and threaded aperture 20*e*2.

Figure 10:
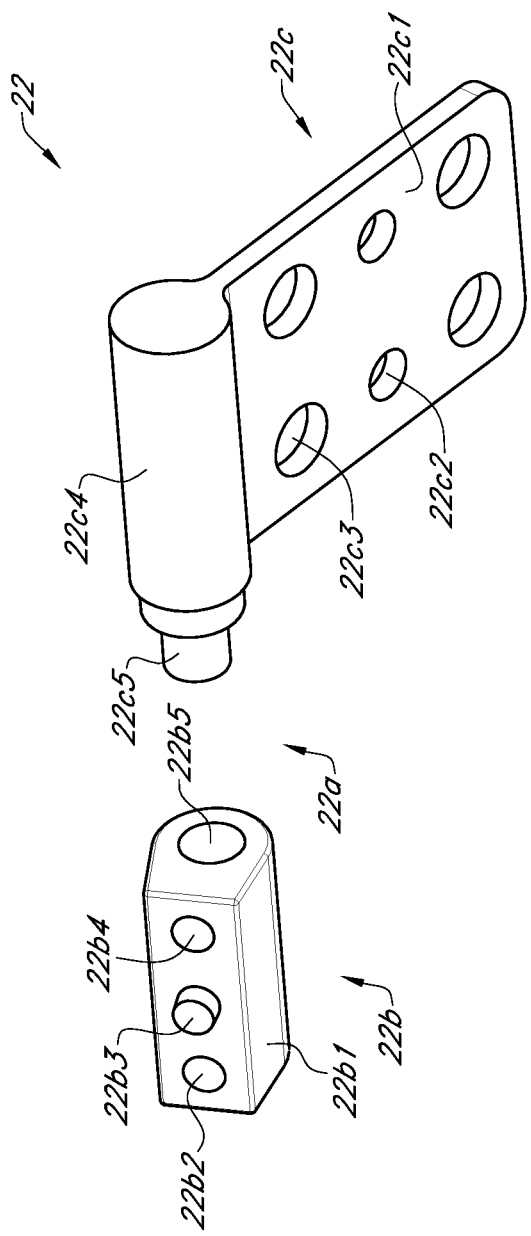
FIG. 10 is an exploded front perspective view of a first version of rotatable assembly of hinge assembly of device stand assembly of FIG. 1.

Turning to FIG. 10, depicted therein is an exploded front perspective view of a first version of rotatable assembly 22*a* with coupling member 22*b*, and coupling member 22*c*. As depicted, coupling member 22*b* includes rectangular portion 22*b*1, threaded aperture 22*b*2, protrusion 22*b*3, threaded aperture 22*b*4, and socket 22*b*5. As depicted, coupling member 22*c* includes plate portion 22*c*l, aperture 22*c*2, aperture 22*c*3, cylindrical portion 22*c*4, and plug portion 22*c*5.

Figure 11:
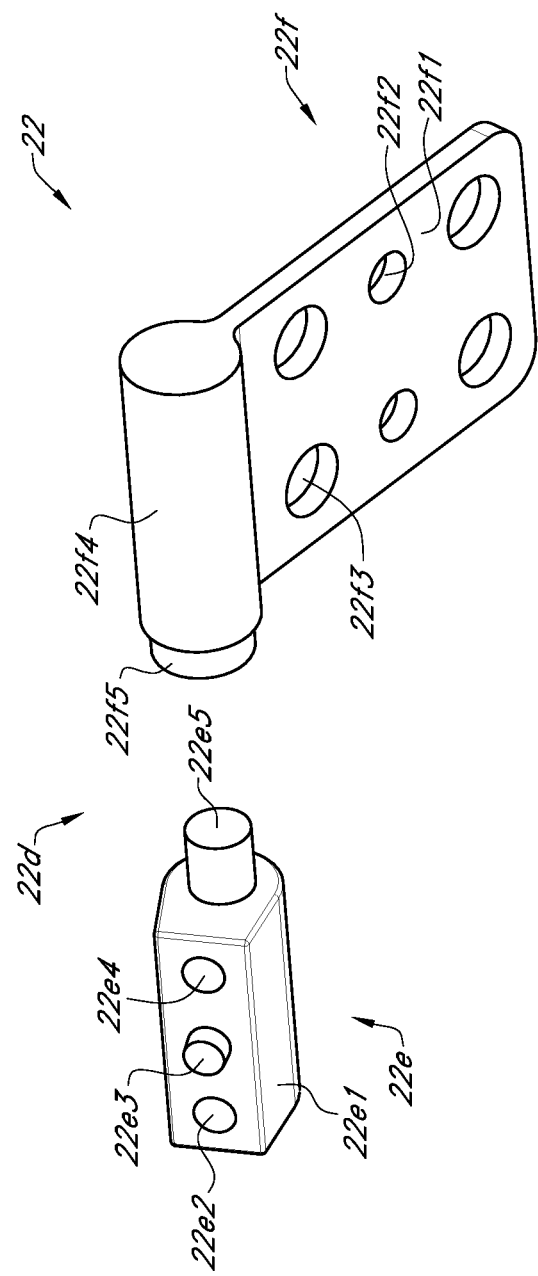
FIG. 11 is an exploded front perspective view of a second version of rotatable assembly of hinge assembly of device stand assembly of FIG. 1.

Turning to FIG. 11, depicted therein is an exploded front perspective view of a second version of rotatable assembly 22*d* of hinge assembly 22 of device stand assembly 10. As depicted, rotatable assembly 22*d* includes coupling member 22*e*, and coupling member 22*f*. As depicted, coupling member 22*e* includes rectangular portion 22*e*l, threaded aperture 22*e*2, aperture 22*e*3, threaded aperture 22*e*4, and plug portion 22*e*5. As depicted, coupling member 22*f* includes plate portion 22*f*1, aperture 22*f*2, aperture 22*f*3, cylindrical portion 22*f*4, and socket portion 22*f*5.

Figure 12:
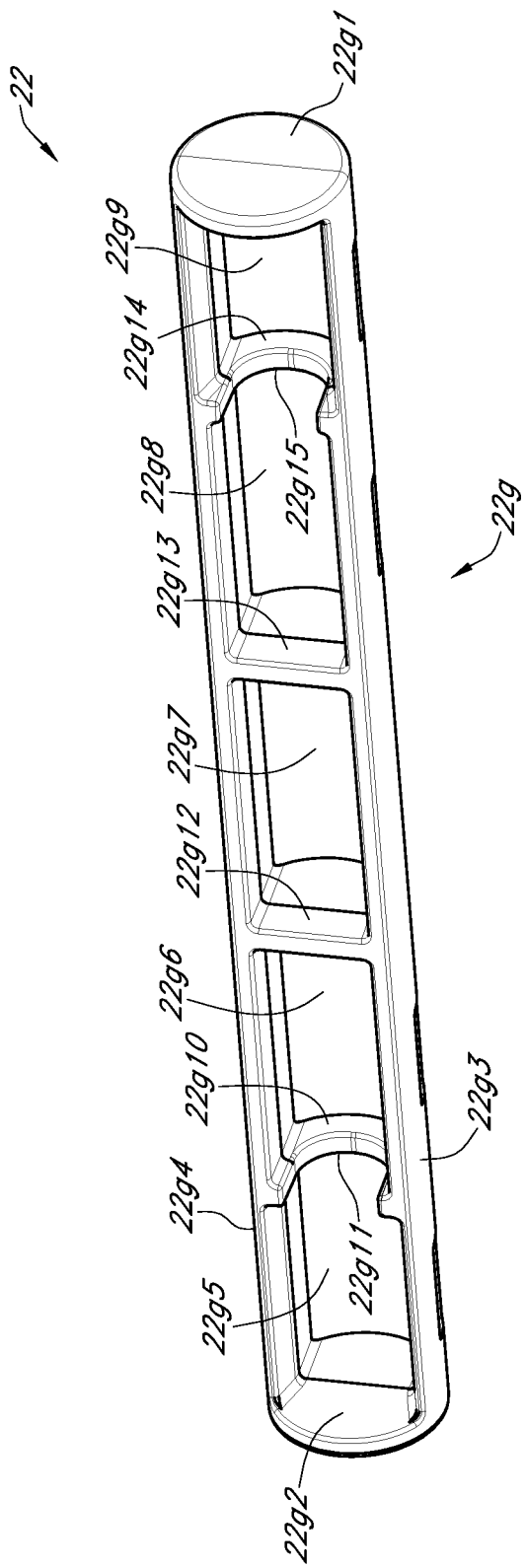
FIG. 12 is a front perspective view of cylindrical member of hinge assembly of device stand assembly of FIG. 1.

Turning to FIG. 12, depicted therein is a front perspective view of cylindrical member 22*g* of hinge assembly 22 of device stand assembly 10. As depicted, cylindrical member 22*g* is shown to include end 22*g*1, end 22*g*2, side 22*g*3, side 22*g*4, and aperture 22*g*5, aperture 22*g*6, aperture 22*g*7, aperture 22*g*8, aperture 22*g*9, support portion 22*g*10, internal surface 22*g*11, support portion 22*g*12, support portion 22*g*13, support portion 22*g*14, and internal surface 22*g*15.

Figure 13:
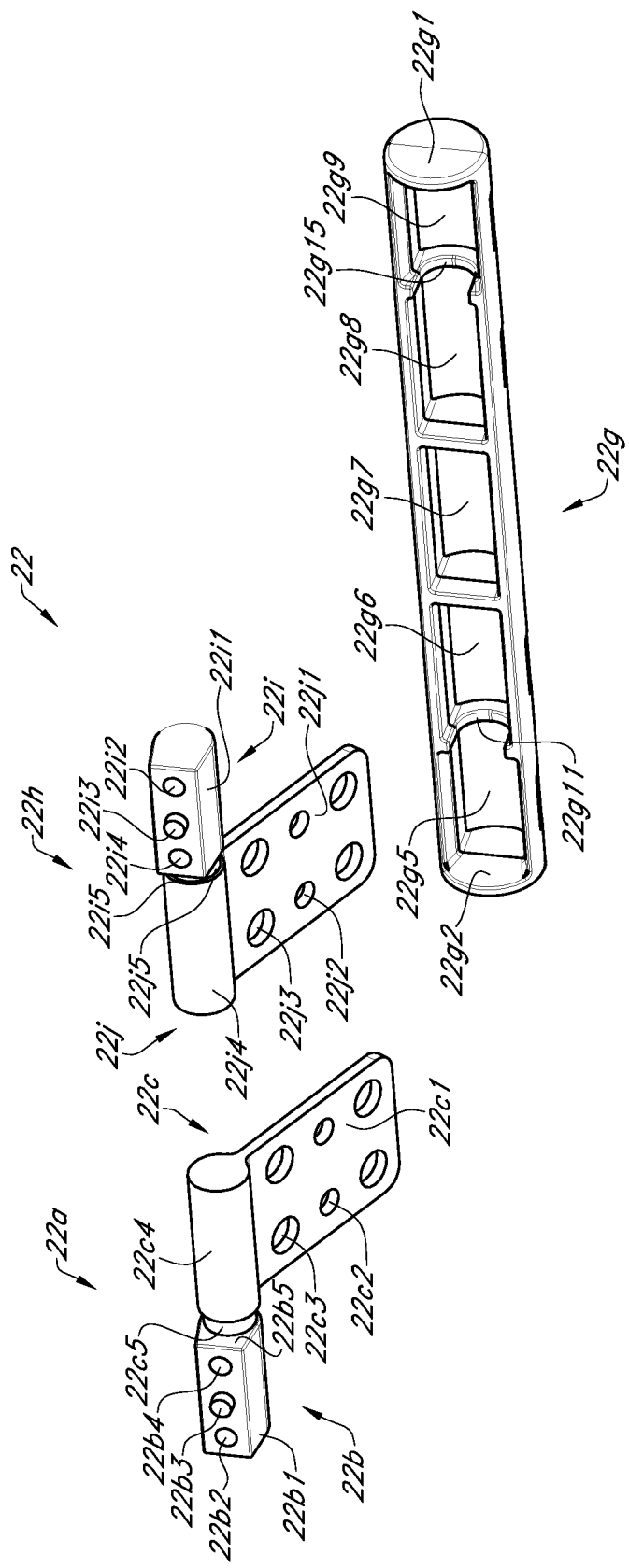
FIG. 13 is an exploded front perspective view of hinge assembly of device stand assembly of FIG. 1.

Turning to FIG. 13, depicted therein is an exploded front perspective view of hinge assembly 22 of device stand assembly 10, which includes coupling member 22*i* and coupling member 22*j*. As depicted, coupling member 22*i* includes rectangular portion 22*i*1, threaded aperture 2212, aperture 22*i*3, threaded aperture 2214, and plug portion 22*i*5. As depicted, coupling member 22*j* includes plate portion 22*j*1, aperture 22*j*2, aperture 22*j*3, cylindrical portion 22*j*4, and socket portion 22*j*5.

Figure 14:
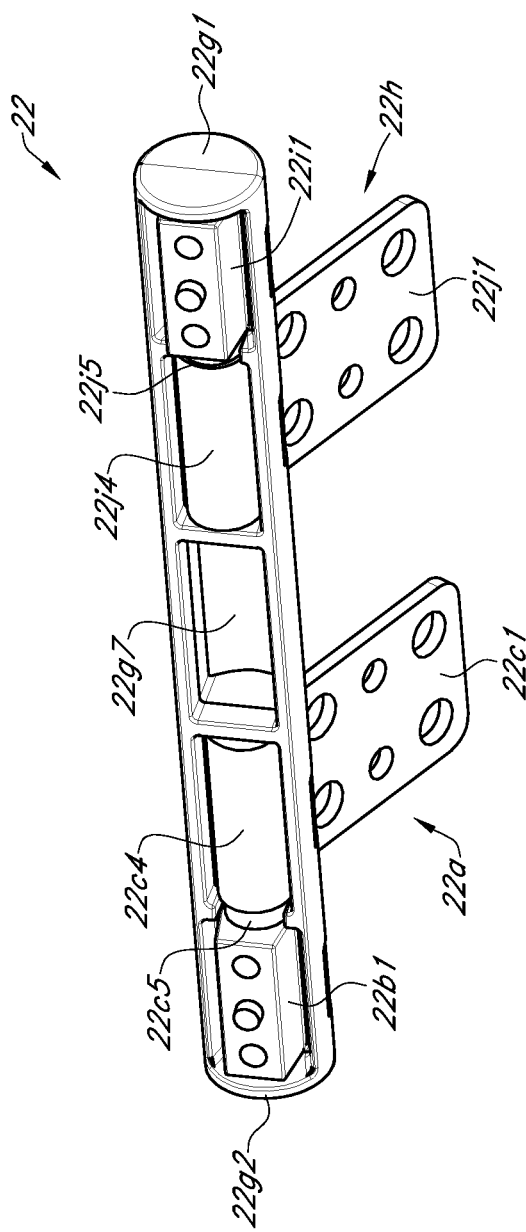
FIG. 14 is a front perspective view of hinge assembly of device stand assembly of FIG. 1.

Turning to FIG. 14, depicted therein is a front perspective view of hinge assembly 22 of device stand assembly 10.

Figure 15:
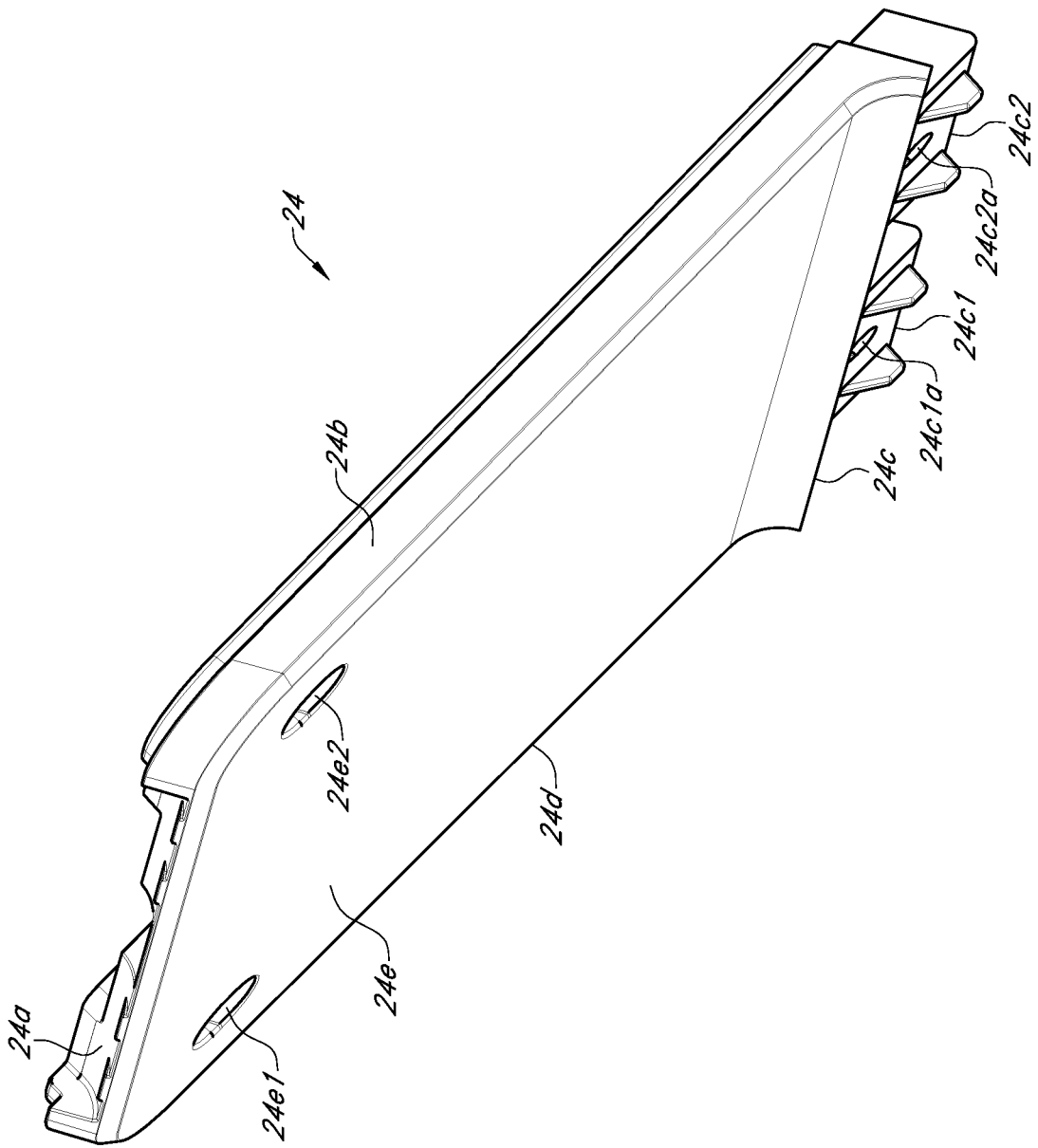
FIG. 15 is a front perspective view of stand upper front of device stand assembly of FIG. 1.

Turning to FIG. 15, depicted therein is a front perspective view of stand upper front 24 of device stand assembly 10. As depicted, stand upper front 24 is shown to include side 24*a*, side 24*b*, side 24*c*, side 24*d*, and base 24*e*. As depicted, side 24*c* is shown to include tab member 24*c*1 with aperture 24*c*1*a*, and tab member 24*c*2 with aperture 24*c*2*a*. Depicted implementation of stand upper front 24 is shown to include base 24*e* with aperture 24*e*1 and aperture 24*e*2.

Figure 16:
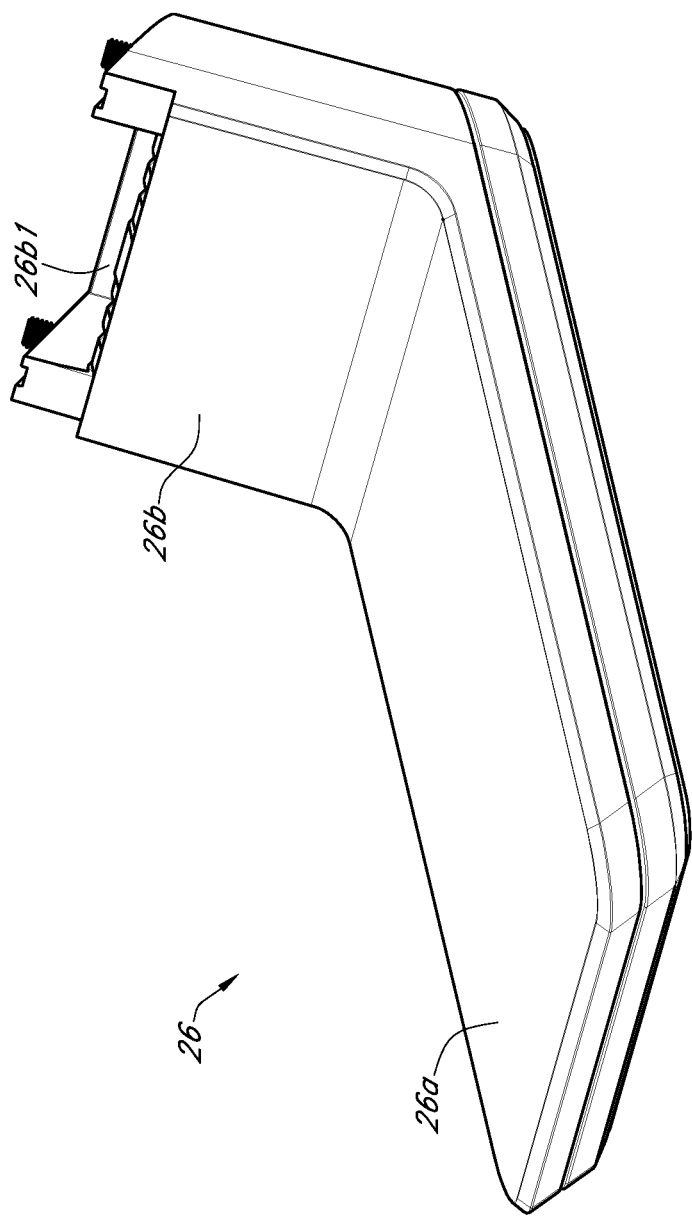
FIG. 16 is a front perspective view of stand lower of device stand assembly of FIG. 1.

Turning to FIG. 16, depicted therein is a front perspective view of stand lower 26 of device stand assembly 10. Depicted implementation of stand lower 26 is shown to include lower portion 26*a*, and upper portion 26*b* with coupling edge 26*b*1.

Figure 17:
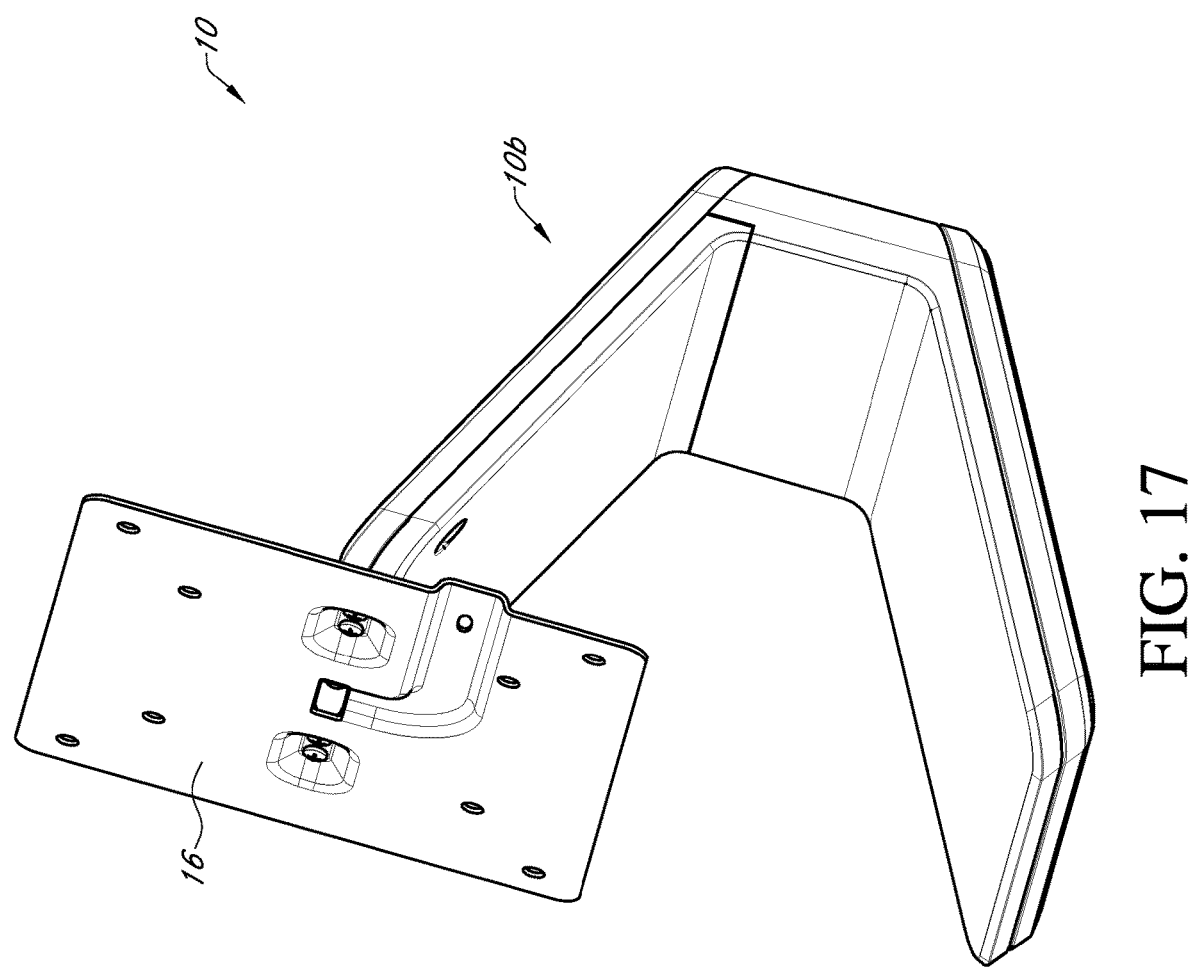
FIG. 17 is a front perspective partial view of device stand assembly of FIG. 1.

Turning to FIG. 17, depicted therein is a front perspective partial view of device stand assembly 10.

Figure 18:
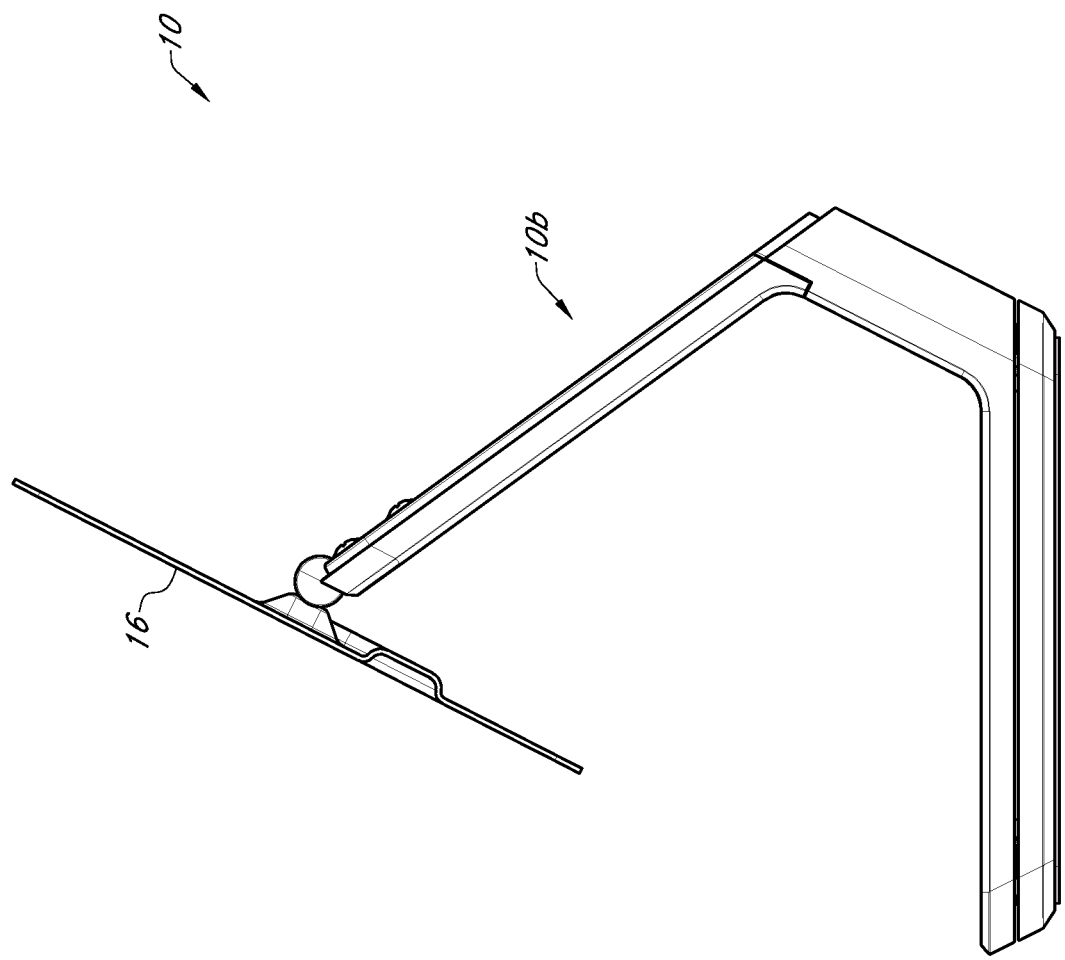
FIG. 18 is a side elevational partial view of device stand assembly of FIG. 1.

Turning to FIG. 18, depicted therein is a side elevational partial view of stand assembly of device stand assembly 10.

Figure 19:
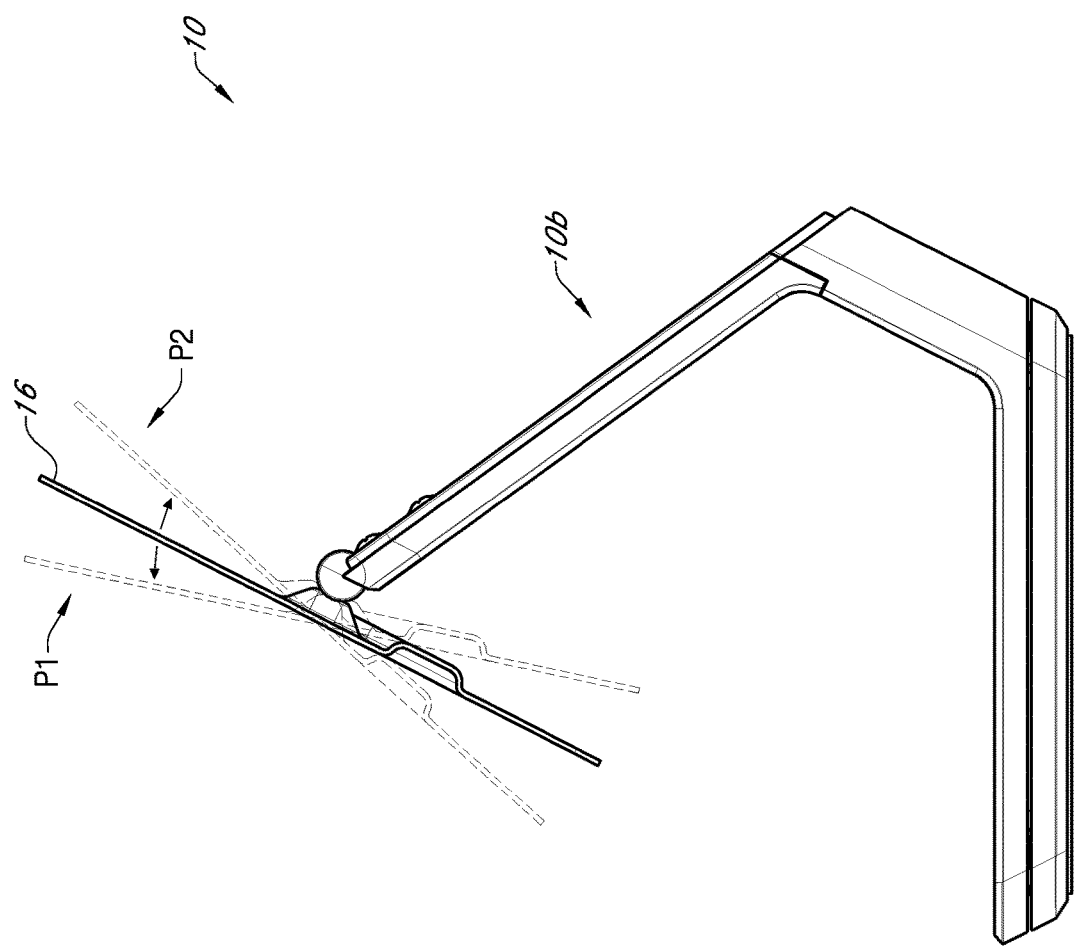
FIG. 19 is a side elevational partial view of device stand assembly of FIG. 1.

Turning to FIG. 19, depicted therein is a side elevational partial view of stand assembly of device stand assembly 10.

Figure 20:
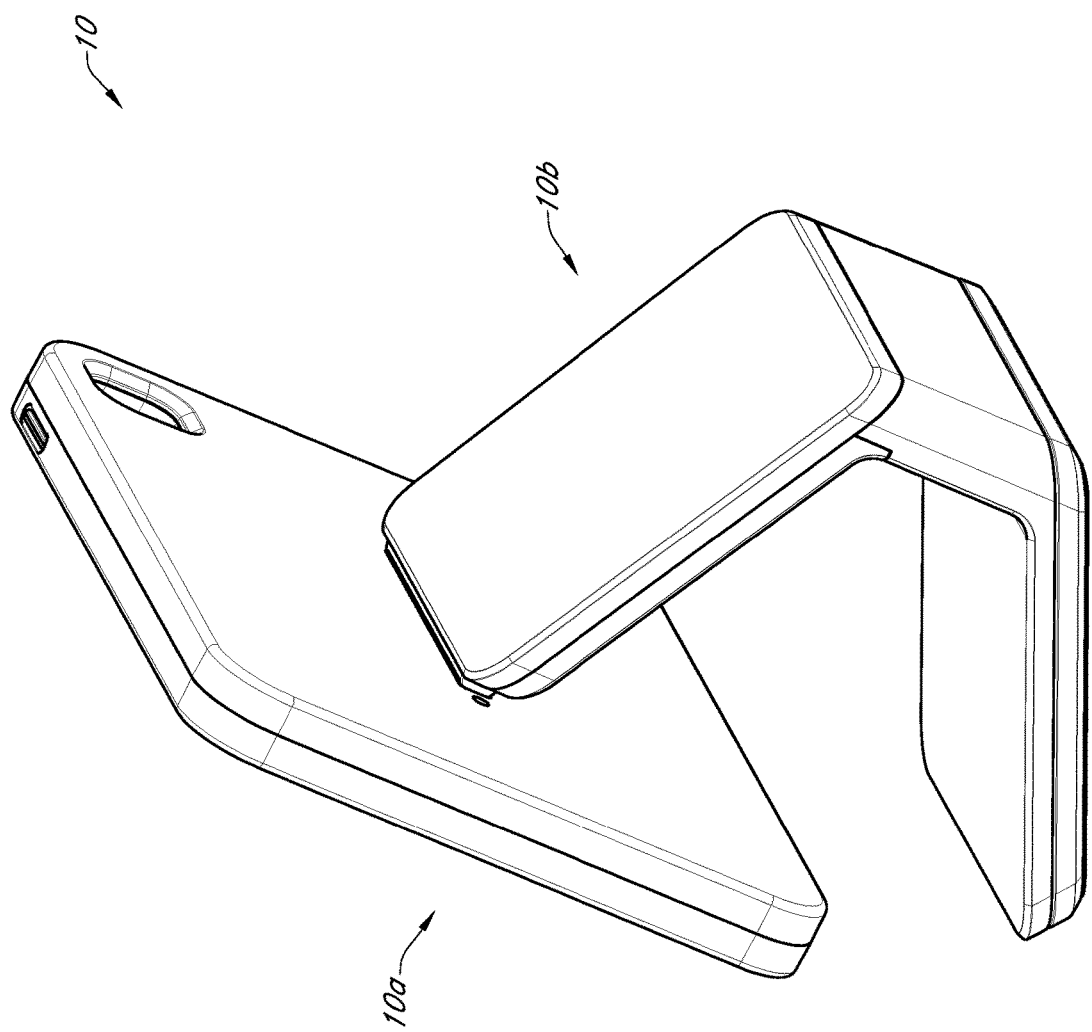
FIG. 20 is a rear perspective view of device stand assembly of FIG. 1.

Turning to FIG. 20, depicted therein is a rear perspective view of device stand assembly 10 with portable device 100.

Figure 21:
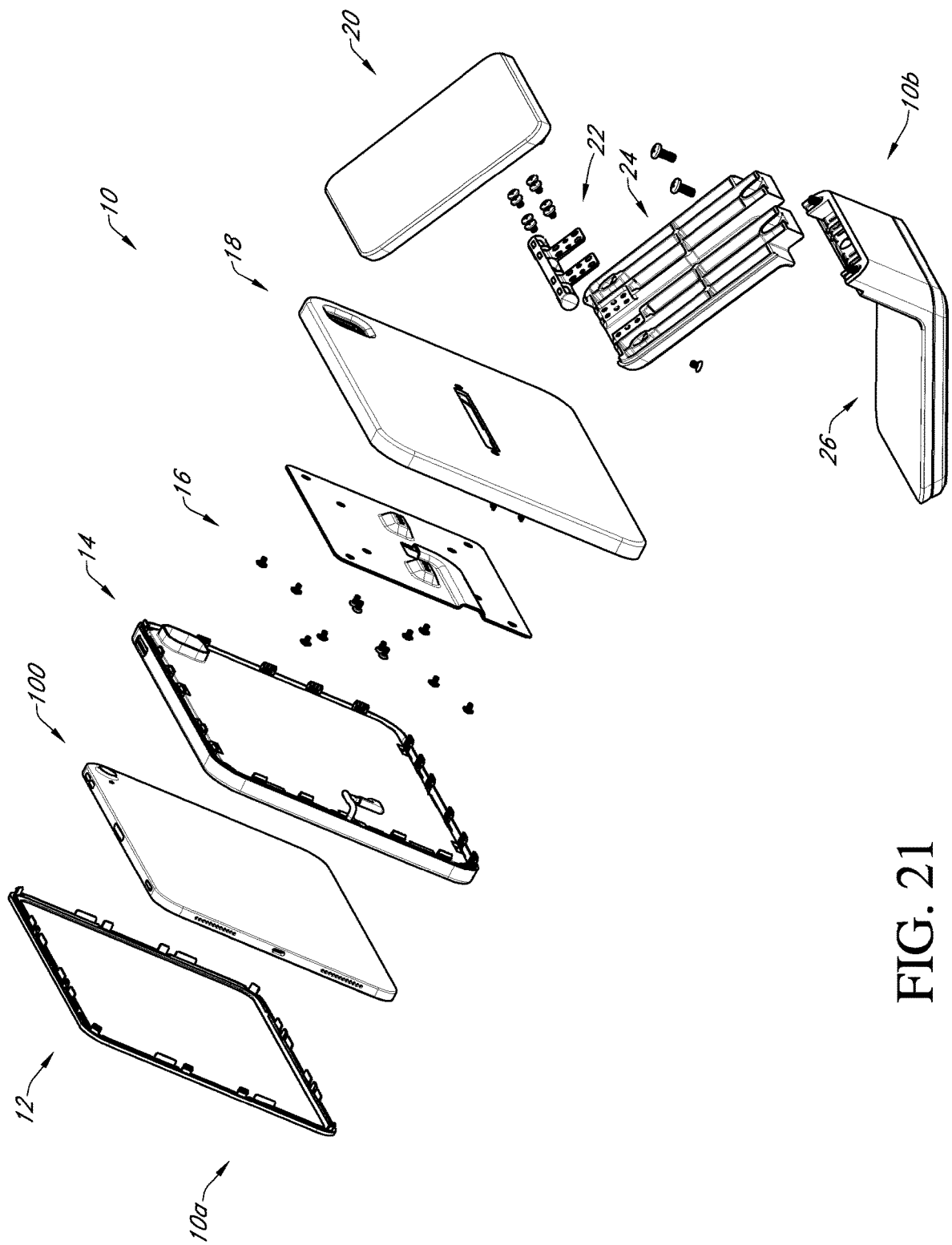
FIG. 21 is an exploded rear perspective view of device stand assembly of FIG. 1.

Turning to FIG. 21, depicted therein is a exploded rear perspective view of device stand assembly 10.

Figure 22:
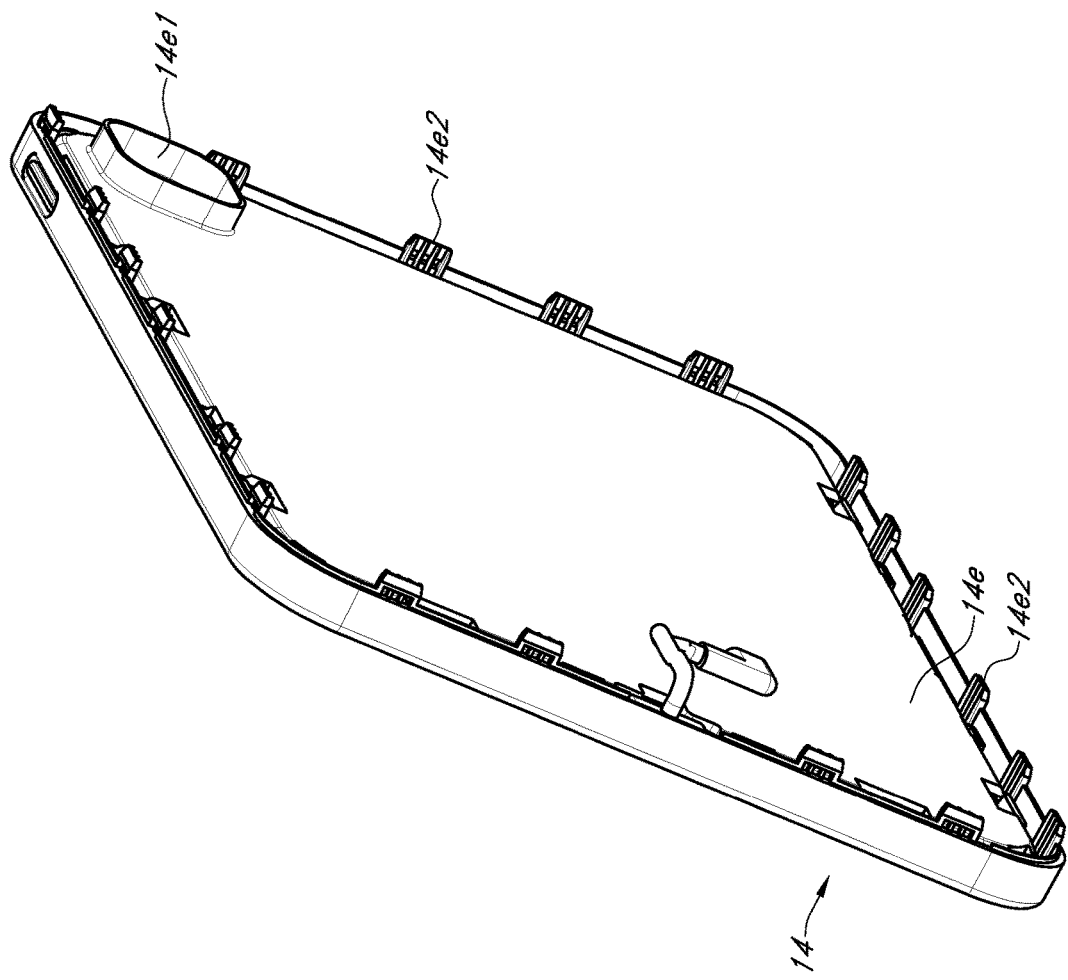
FIG. 22 is a rear perspective view of device holder front of device stand assembly of FIG. 1.

Turning to FIG. 22, depicted therein is a rear perspective view of device holder front 14 of device stand assembly 10.

Figure 23:
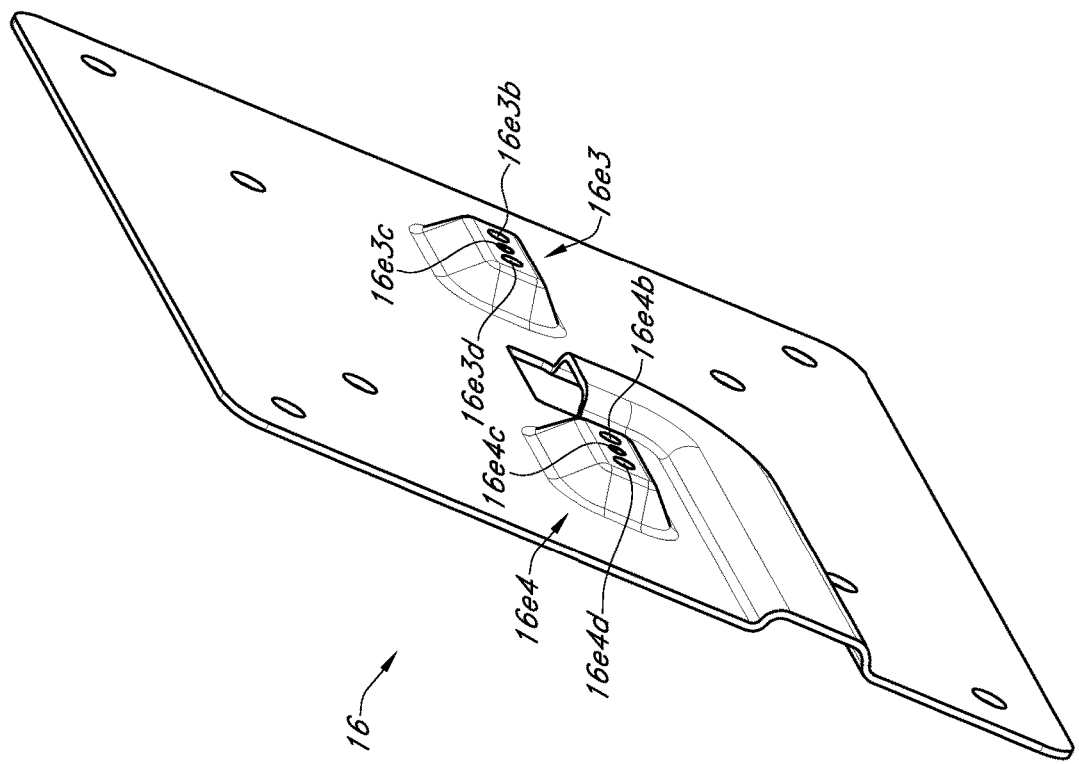
FIG. 23 is a rear perspective view of plate member of device stand assembly of FIG. 1.

Turning to FIG. 23, depicted therein is a rear perspective view of plate member 16 of device stand assembly 10.

Figure 24:
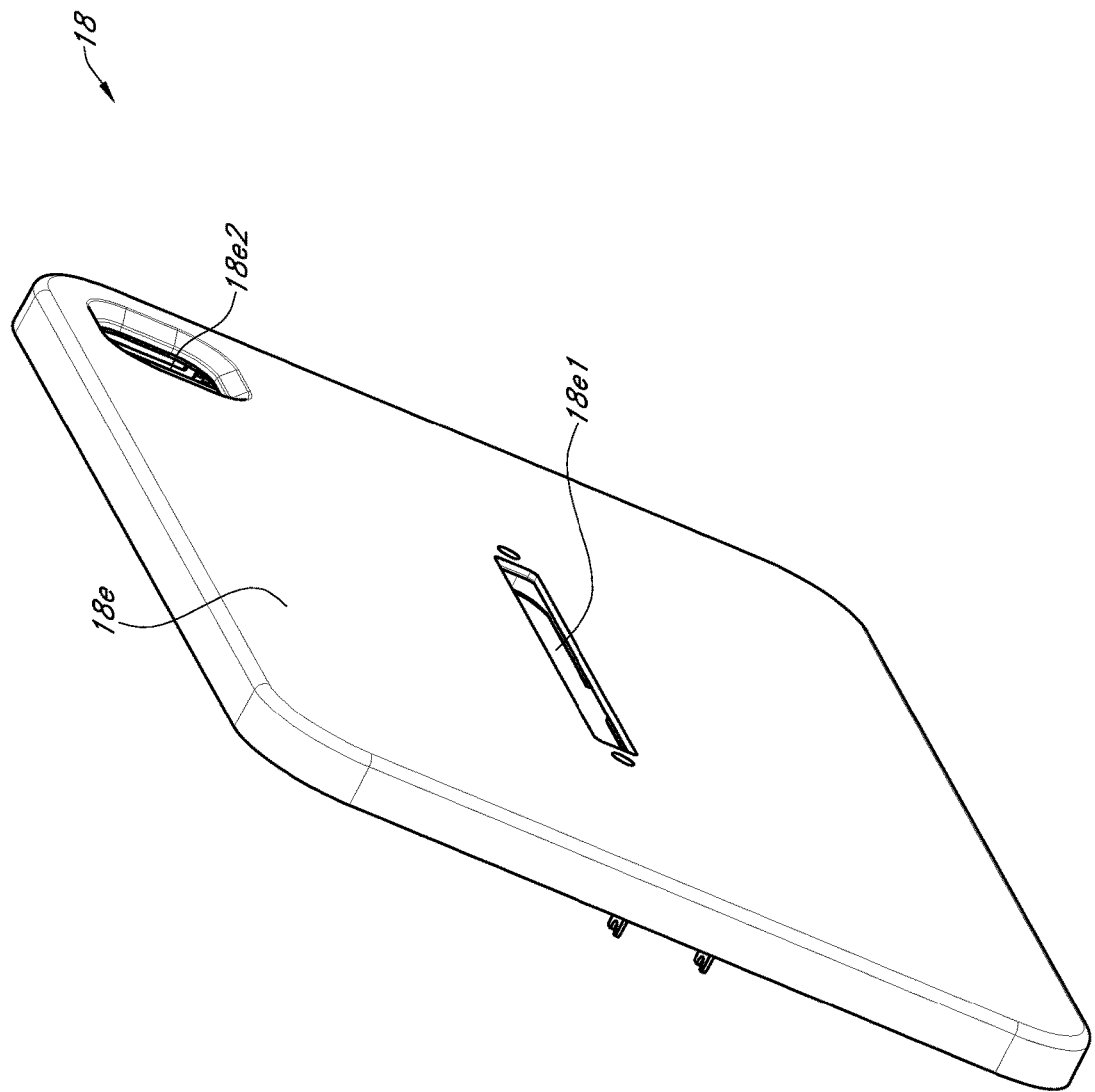
FIG. 24 is a rear perspective view of device holder back of device stand assembly of FIG. 1.

Turning to FIG. 24, depicted therein is a rear perspective view of device holder back 18 of device stand assembly 10.

Figure 25:
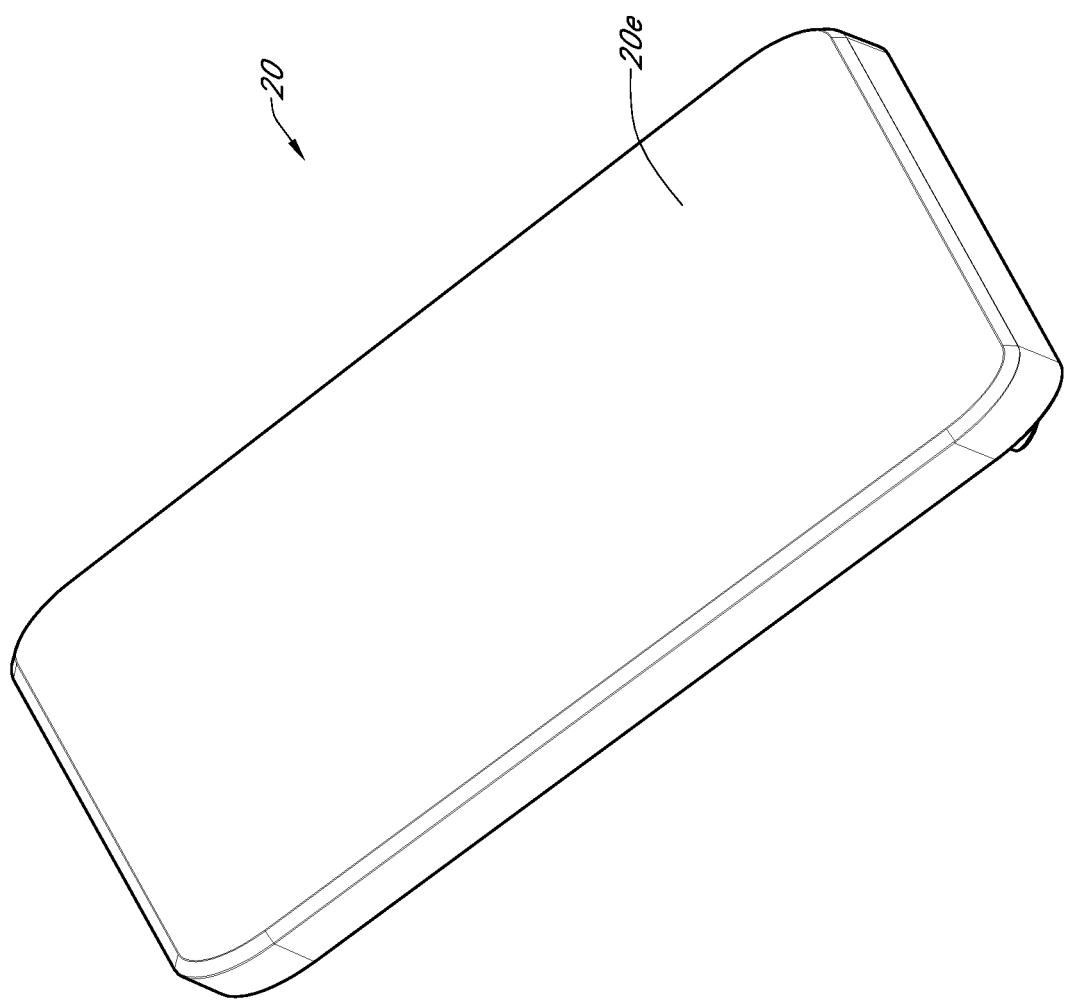
FIG. 25 is a rear perspective view of stand upper back of device stand assembly of FIG. 1.

Turning to FIG. 25, depicted therein is a rear perspective view of stand upper back 20 of device stand assembly 10.

Figure 26:
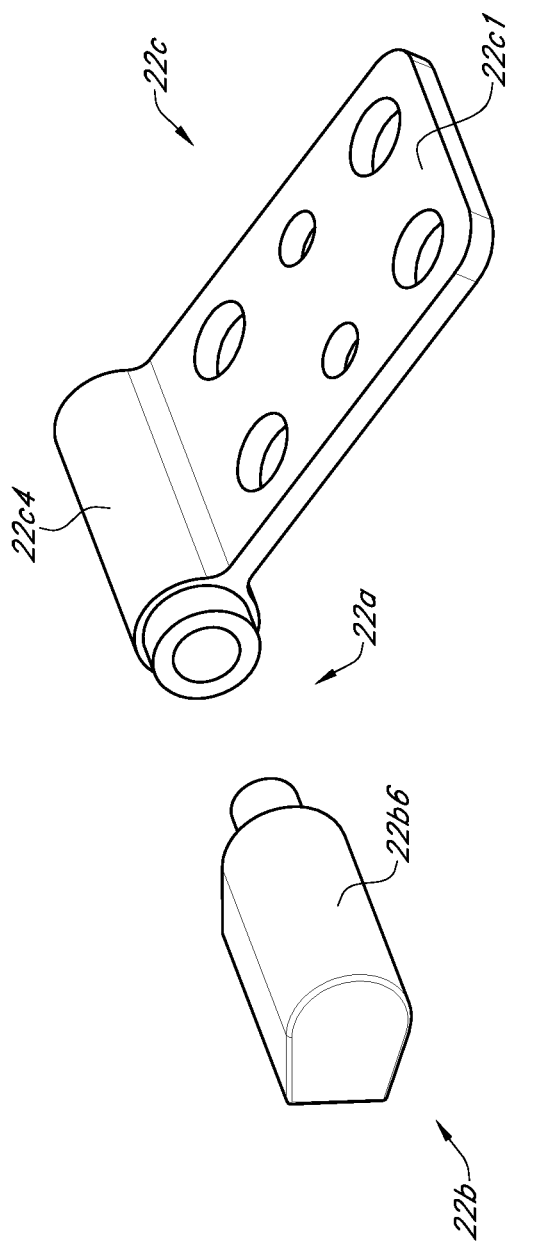
FIG. 26 is an exploded rear perspective view of a first version of rotatable assembly of hinge assembly of device stand assembly of FIG. 1.

Turning to FIG. 26, depicted therein is an exploded rear perspective view of a first version of rotatable assembly 22*a* of hinge assembly 22 of device stand assembly 10. Depicted implementation of rotatable assembly 22*a* is shown to include coupling member 22*b* with surface portion 22*b*6.

Figure 27:
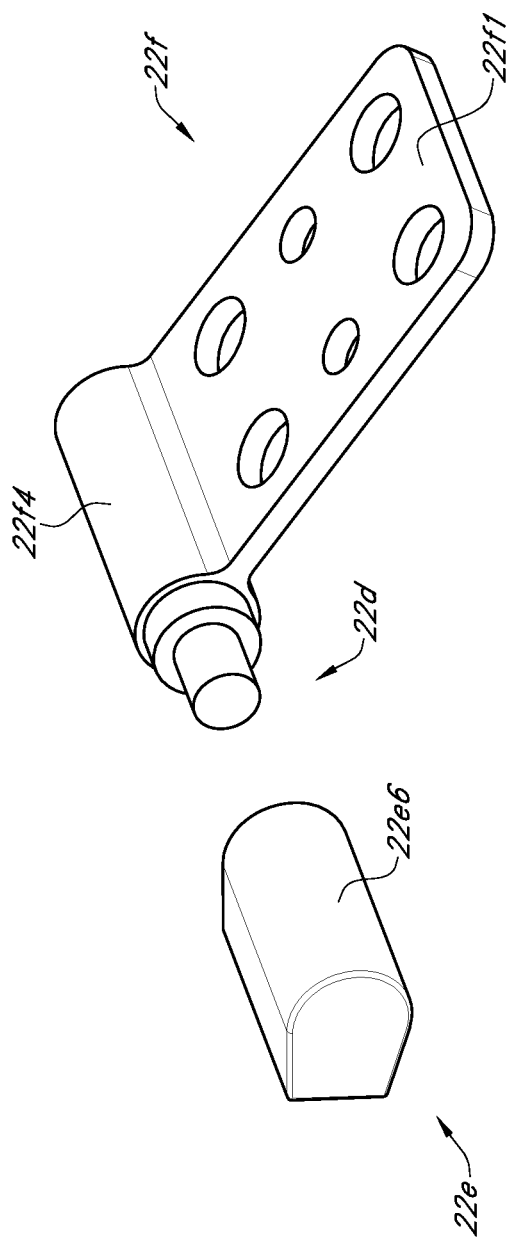
FIG. 27 is an exploded rear perspective view of a second version of rotatable assembly of hinge assembly of device stand assembly of FIG. 1.
Figure 28:
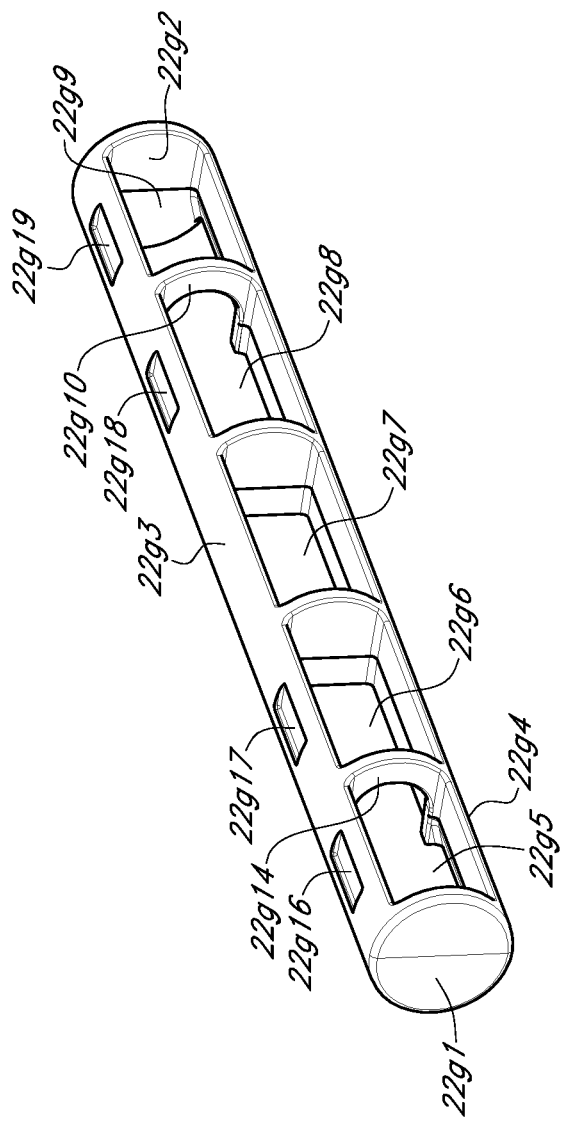
FIG. 28 is a rear perspective view of cylindrical member of hinge assembly of device stand assembly of FIG. 1.

Turning to FIG. 27, depicted therein is an exploded rear perspective view of a second version of rotatable assembly 22*d* of hinge assembly 22 of device stand assembly 10. Depicted implementation of rotatable assembly 22*d* is shown to include coupling member 22*e* with surface portion 22*e*6. Turning to FIG. 28, depicted therein is a rear perspective view of cylindrical member 22*g* of hinge assembly 22 of device stand assembly 10. Depicted implementation of cylindrical member 22*g* is shown to include aperture 22*g*16, aperture 22*g*17, aperture 22*g*18, and aperture 22*g*19.

Figure 29:
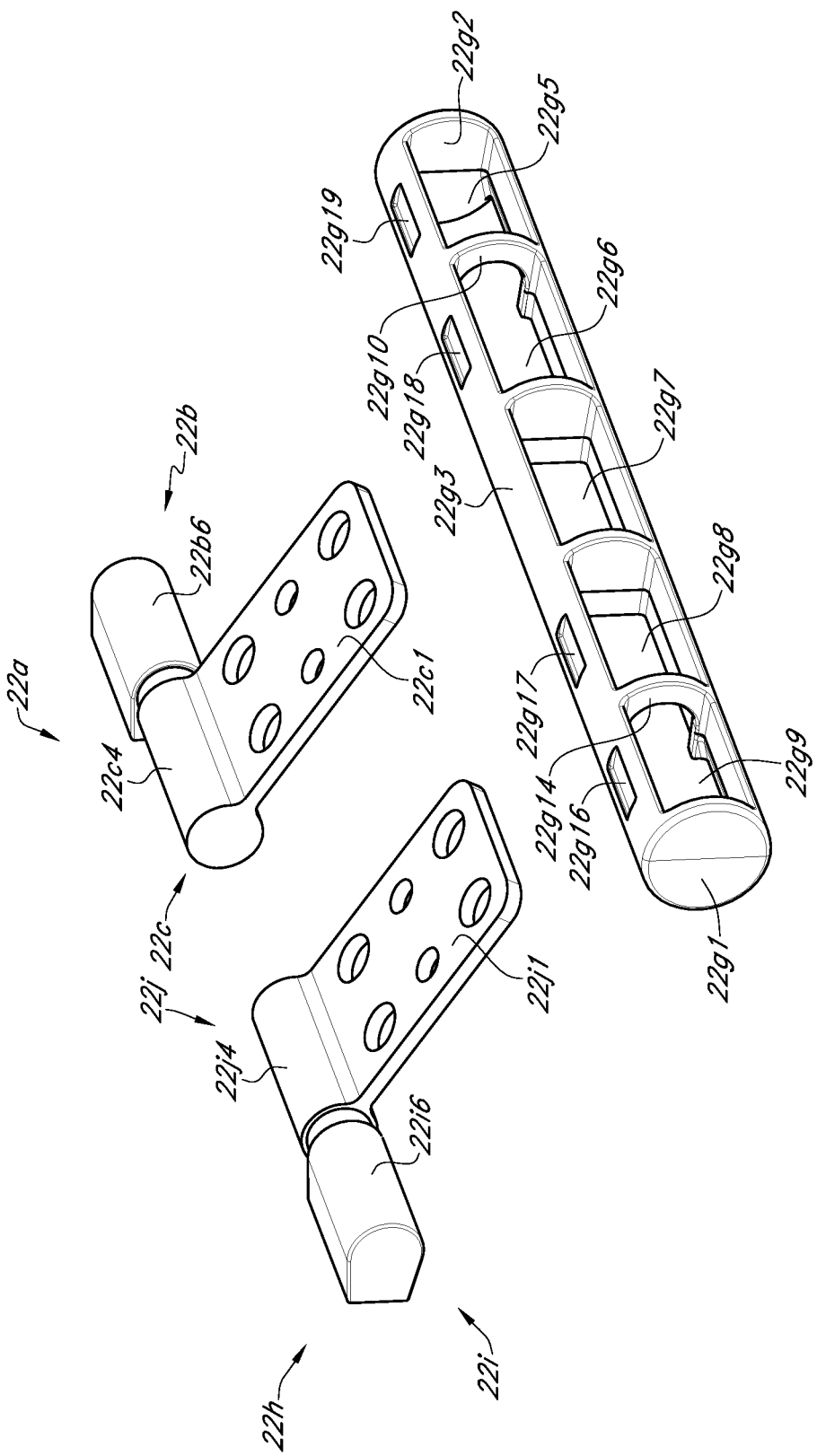
FIG. 29 is an exploded rear perspective view of hinge assembly of device stand assembly of FIG. 1.

Turning to FIG. 29, depicted therein is an exploded rear perspective view of hinge assembly 22 of device stand assembly 10. Depicted implementation of hinge assembly 22 is shown to include coupling member 22*i* with surface portion 22*i*16.

Figure 30:
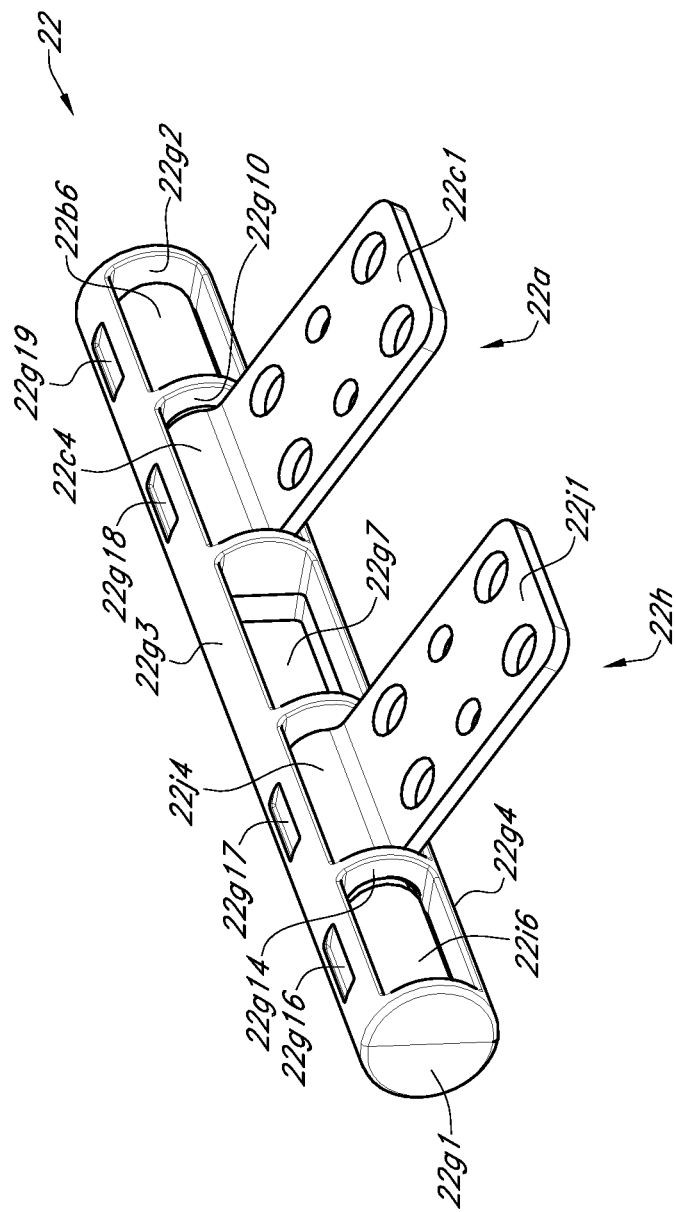
FIG. 30 is a rear perspective view of hinge assembly of device stand assembly of FIG. 1.

Turning to FIG. 30, depicted therein is a rear perspective view of hinge assembly 22 of device stand assembly 10.

Figure 31:
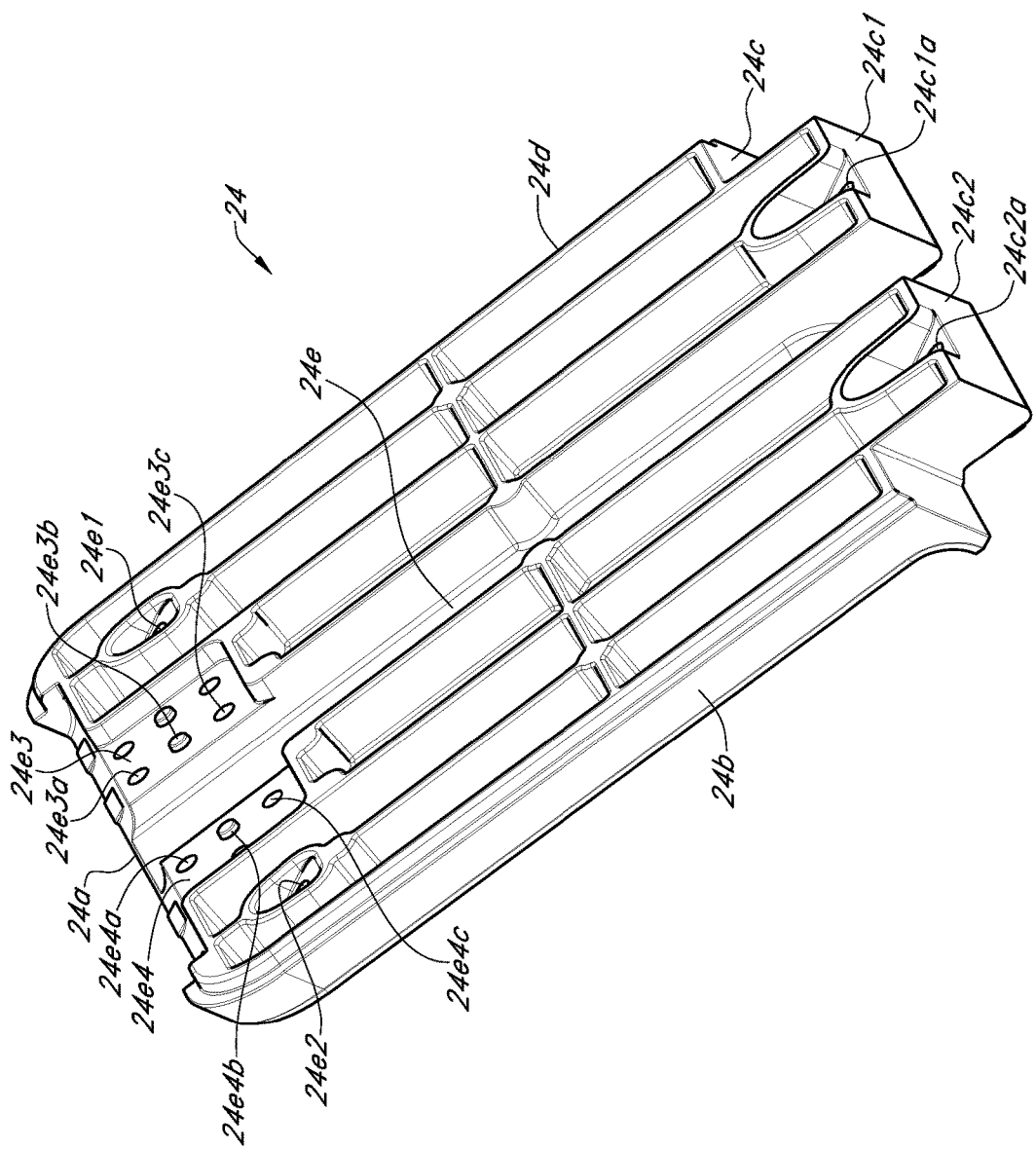
FIG. 31 is a rear perspective view of stand upper front of device stand assembly of FIG. 1.

Turning to FIG. 31, depicted therein is a rear perspective view of stand upper front 24 of device stand assembly 10. Depicted implementation of stand upper front 24 is shown to include base 24e with coupling surface 24e3 and coupling surface 24e4. Depicted implementation of coupling surface 24e3 is shown to include threaded aperture 24e3a, protrusion 24e3b, and threaded aperture 24e3c. Depicted implementation of coupling surface 24e4 is shown to include threaded aperture 24e4a, protrusion 24e4b, and threaded aperture 24e4c.

Figure 32:
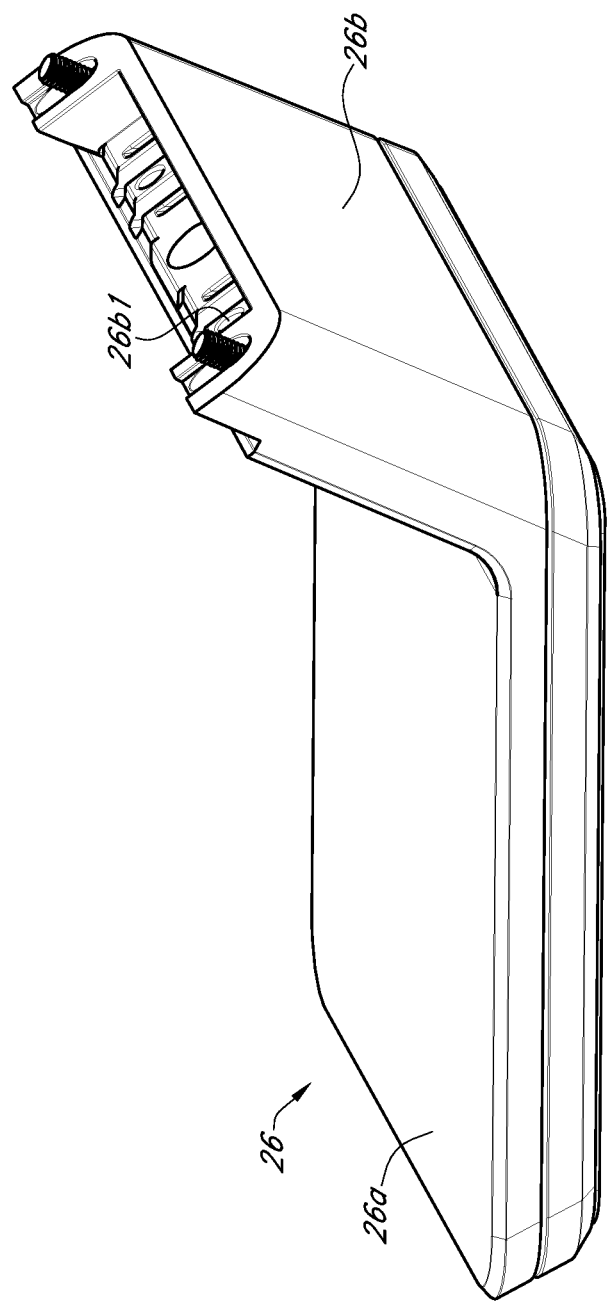
FIG. 32 is a rear perspective view of stand lower of device stand assembly of FIG. 1.

Turning to FIG. 32, depicted therein is a rear perspective view of stand lower 26 of device stand assembly 10.

Figure 33:
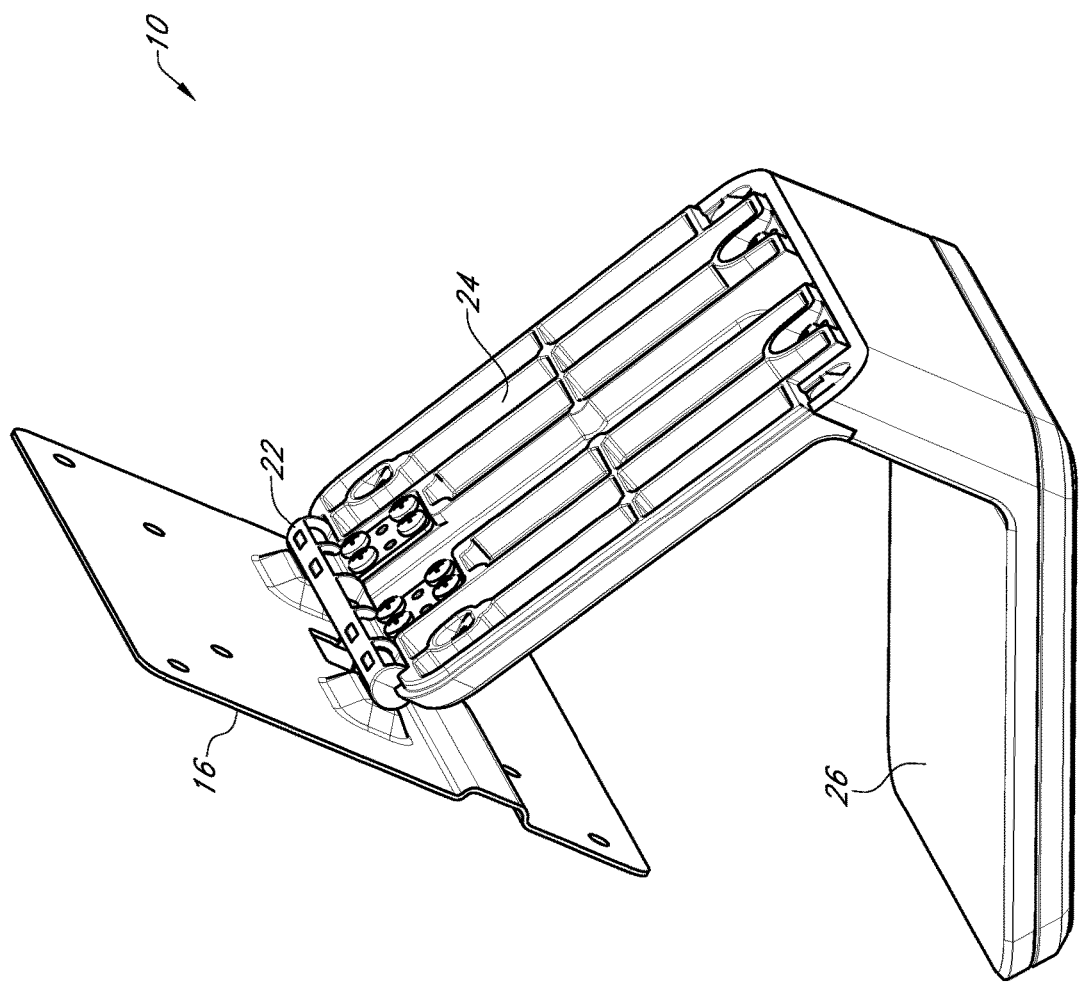
FIG. 33 is a rear perspective partial view of device stand assembly of FIG. 1.

Turning to FIG. 33, depicted therein is a rear perspective partial view of stand assembly of device stand assembly 10.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A device stand system for a portable electronic tablet device, the device stand system comprising:
   (I) a device holder assembly couplable with the portable electronic tablet device;
   (II) a stand assembly; and
   (III) a hinge assembly having an angular pivot range, the hinge assembly being coupled with and located between the device holder assembly and the stand assembly,
   wherein the device holder assembly is pivotable through the angular pivot range of the hinge assembly relative to the stand assembly,
   wherein the device holder assembly includes a device holder back member,
   wherein the device holder assembly includes a plate member coupled to the device holder back member,
   wherein the plate member is positioned between the device holder back member and the device holder front member,
   wherein the hinge assembly is coupled to the plate member,
   wherein the device holder back member includes an elongated aperture,
   wherein the hinge assembly is coupled to the plate member through the elongated aperture of the device holder back member,
   wherein the plate member is positioned between the hinge assembly and the device holder front member,
   wherein the plate member includes at least one protruded surface portion, and
   wherein the hinge assembly is coupled to the at least one protruded surface portion of the plate member.

2. The device stand system of claim 1 wherein the device holder assembly includes a device holder front member couplable to the portable electronic tablet device, the device holder front member including:
   a base,
   a first side wall extending perpendicularly from the base,
   a second side wall extending perpendicularly from the base,
   a third side wall extending perpendicularly from the base, and a fourth side wall extending perpendicularly from the base,
wherein the second side wall perpendicularly extends with respect to the first side wall,
wherein the third side wall parallelly extends with respect to the first side wall, and
wherein the fourth side wall parallelly extends with respect to the second side wall.

3. The device stand system of claim 2
wherein the device holder assembly includes a frame member removably coupled to the device holder front member, and
wherein the frame member is removably coupled to the first side wall, the second side wall, the third side wall, and the fourth side wall of the device holder front member.

4. The device stand system of claim 3
wherein the device holder back member coupled to the device holder front member, and
wherein the device holder front member is positioned between the frame member and the device holder back member.

5. The device stand system of claim 1
wherein the hinge assembly includes at least one peg member,
wherein the plate member includes at least one non-threaded aperture, and
wherein the at least one peg member of the hinge assembly is coupled with the at least one non-threaded aperture of the plate member.

6. A device stand system for a portable electronic tablet device, the device stand system comprising:
(I) a device holder assembly couplable with the portable electronic tablet device;
(II) a stand assembly; and
(III) a hinge assembly having an angular pivot range, the hinge assembly being coupled with and located between the device holder assembly and the stand assembly,
wherein the device holder assembly is pivotable through the angular pivot range of the hinge assembly relative to the stand assembly,
wherein the stand assembly includes a stand lower member having a lower portion and an upper portion extending from the lower portion at a first angle,
wherein the stand assembly includes a stand upper front member coupled with the upper portion of the stand lower member and extending from the upper portion of the stand lower member at a second angle,
wherein the sum of the first angle and the second angle is greater than ninety degrees,
wherein the stand upper front member includes a first side coupled with the hinge assembly,
wherein the hinge assembly includes at least one axis of rotation extending parallel with the first side,
wherein the stand upper front member includes a second side extending parallel with the first side,
wherein the second side of the stand upper front member is coupled with the stand lower member,
wherein the hinge assembly includes at least one rotatable assembly,
wherein the at least one rotatable assembly includes a first coupling member and a second coupling member,
wherein the first coupling member and the second coupling member are pivotally coupled together, and
wherein the first coupling member is coupled with the device holder assembly and the second coupling member is coupled with the stand assembly.

7. The device stand system of claim 6
wherein the first angle and the second angle of the stand assembly are oblique angles.

8. The device stand system of claim 6
wherein the hinge assembly includes a cylindrical member having a first aperture coupled with the first coupling member of the hinge assembly, and
wherein the cylindrical member has a second aperture coupled with the second coupling member of the hinge assembly.

9. A device stand system for a portable electronic tablet device, the device stand system comprising:
(I) a device holder assembly couplable with the portable electronic tablet device; and
(II) a hinge assembly having an angular pivot range, the hinge assembly being coupled with the device holder assembly,
wherein the device holder assembly is pivotable through the angular pivot range of the hinge assembly,
wherein the device holder assembly includes a device holder back member,
wherein the device holder assembly includes a plate member coupled to the device holder back member,
wherein the hinge assembly is coupled to the plate member,
wherein the device holder back member includes an elongated aperture,
wherein the hinge assembly is coupled to the plate member through the elongated aperture of the device holder back member,
wherein the plate member includes at least one protruded surface portion, and
wherein the hinge assembly is coupled to the at least one protruded surface portion of the plate member.

10. A device stand system for a portable electronic tablet device, the device stand system comprising:
(I) a stand assembly; and
(II) a hinge assembly having an angular pivot range, the hinge assembly being coupled with the stand assembly,
wherein the stand assembly is pivotable through the angular pivot range of the hinge assembly,
wherein the stand assembly includes a stand lower member having a lower portion and an upper portion extending from the lower portion at a first angle,
wherein the stand assembly includes a stand upper front member coupled with the upper portion of the stand lower member and extending from the upper portion of the stand lower member at a second angle,
wherein the sum of the first angle and the second angle is greater than ninety degrees,
wherein the stand upper front member includes a first side coupled with the hinge assembly,
wherein the hinge assembly includes at least one axis of rotation extending parallel with the first side,
wherein the stand upper front member includes a second side extending parallel with the first side,
wherein the second side of the stand upper front member is coupled with the stand lower member,
wherein the hinge assembly includes at least one rotatable assembly,
wherein the at least one rotatable assembly includes a first coupling member and a second coupling member,
wherein the first coupling member and the second coupling member are pivotally coupled together, wherein the first coupling member is coupled with the device holder assembly and the second coupling member is coupled with the stand assembly,
wherein the hinge assembly includes a cylindrical member having a first aperture coupled with the first coupling member of the hinge assembly, and
wherein the cylindrical member has a second aperture coupled with the second coupling member of the hinge assembly.

* * * * *